(12) United States Patent
Yano et al.

(10) Patent No.: US 9,593,271 B2
(45) Date of Patent: Mar. 14, 2017

(54) CURABLE COMPOSITION AND CURED PRODUCT THEREOF

(71) Applicant: KANEKA CORPORATION, Osaka-shi, Osaka (JP)

(72) Inventors: Ayako Yano, Takasago (JP); Atsushi Fukunaga, Pasadena, TX (US); Atsushi Kawakami, Takasago (JP); Akira Ogawa, Takasago (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 14/345,751

(22) PCT Filed: Sep. 20, 2012

(86) PCT No.: PCT/JP2012/073990
§ 371 (c)(1),
(2) Date: Mar. 19, 2014

(87) PCT Pub. No.: WO2013/042702
PCT Pub. Date: Mar. 28, 2013

(65) Prior Publication Data
US 2014/0288222 A1    Sep. 25, 2014

(30) Foreign Application Priority Data

Sep. 22, 2011  (JP) ................................ 2011-207951

(51) Int. Cl.
| | |
|---|---|
| C09K 3/10 | (2006.01) |
| C08L 43/04 | (2006.01) |
| C08K 5/57 | (2006.01) |
| C08L 33/08 | (2006.01) |
| C08G 65/26 | (2006.01) |
| C08G 65/336 | (2006.01) |
| C08K 5/00 | (2006.01) |

(52) U.S. Cl.
CPC ........ C09K 3/1006 (2013.01); C08G 65/2663 (2013.01); C08G 65/336 (2013.01); C08K 5/0016 (2013.01); C08K 5/57 (2013.01); C08L 33/08 (2013.01); C08L 43/04 (2013.01); C09K 3/10 (2013.01)

(58) Field of Classification Search
CPC ............................... C08K 5/57; C08L 71/126
USPC .............................. 525/475, 477; 528/18, 38
See application file for complete search history.

(56) References Cited

U.S. PATENT DOCUMENTS

| | | | |
|---|---|---|---|
| 4,783,504 A * | 11/1988 | St. Clair | ............... C08F 287/00 524/270 |
| 5,703,146 A | 12/1997 | Iwakiri et al. | |
| 6,284,309 B1 * | 9/2001 | Bishop | ..................... C23F 1/18 216/105 |
| 6,703,442 B1 | 3/2004 | Ando et al. | |
| 2006/0128919 A1 | 6/2006 | Okamoto et al. | |
| 2008/0269406 A1 | 10/2008 | Bachon et al. | |
| 2010/0055474 A1 | 3/2010 | Bachon et al. | |

FOREIGN PATENT DOCUMENTS

| | | |
|---|---|---|
| CN | 1298415 A | 6/2001 |
| CN | 102086366 A | 6/2011 |
| CN | 102086368 A | 6/2011 |
| CN | 102102004 A | 6/2011 |
| EP | 1 566 412 A1 | 8/2005 |
| EP | 2 527 406 A1 | 11/2012 |
| JP | 2708833 B2 | 2/1998 |
| JP | 2006-63335 A | 3/2006 |
| JP | 2006-199905 A | 8/2006 |
| JP | 2008-546879 A | 12/2008 |
| JP | 2009-513806 A | 4/2009 |
| JP | 2011-153249 A | 8/2011 |
| WO | 99/55755 A1 | 11/1999 |
| WO | 00/56817 A1 | 9/2000 |
| WO | 2004/039892 A1 | 5/2004 |
| WO | 2011/089878 A1 | 7/2011 |

OTHER PUBLICATIONS

International Preliminary Report on Patentability (form PCT/IB/373) dated Mar. 25, 2014 of International Application No. PCT/JP2012/073990, with form PCT/ISA/237 (5 pages).
International Search Report dated Nov. 13, 2012 issued in corresponding application No. PCT/JP2012/073990.
Extended European Search Report dated Jul. 13, 2015, issued in counterpart application No. 12834289.6 (6 pages).
Office Action dated Nov. 2, 2016, issued in counterpart European Application No. 12834289.6 (4 pages).

* cited by examiner

*Primary Examiner* — Tae H Yoon
(74) *Attorney, Agent, or Firm* — Westerman, Hattori, Daniels & Adrian, LLP

(57) ABSTRACT

The present invention provides a sealant composition that includes a reactive silyl group-containing organic polymer, and gives a cured product having a low modulus and not having wrinkles or cracks on the surface even though the sealant includes as a curing catalyst a tetravalent tin compound, which is presumed to reduce recovery. The sealant composition is a one-component curable sealant composition including: a linear organic polymer (A) having a number average molecular weight of 11,000 to 30,000, and having an ethanol-elimination reactive silyl group at a molecular terminal; a tetravalent tin compound (B); and a plasticizer (C).

17 Claims, No Drawings

CURABLE COMPOSITION AND CURED PRODUCT THEREOF

TECHNICAL FIELD

The present invention relates to a curable composition containing at least one organic polymer with a silicon-containing group which contains a hydroxy or hydrolyzable group bonded to a silicon atom and can form a siloxane bond to be cross-linked (hereinafter referred to also as a "reactive silyl group"); and a cured product thereof.

The present invention more specifically relates to a one-component curable sealant composition including a reactive silyl group-containing organic polymer (A), a tetravalent tin compound (B), and a plasticizer (C); and a cured product thereof. The curable sealant composition gives a cured product that has a low modulus and thus does not have wrinkles or cracks even when applied to a frequently moving joint, whereby the cured product can keep its watertightness, airtightness, and good appearance for a long period of time.

BACKGROUND ART

It is known that organic polymers each containing at least one reactive silyl group per molecule are characterized by being cross-linked by the siloxane bond formation involving the hydrolysis or other reactions of the reactive silyl group due to moisture or other factors even at room temperature, whereby a rubbery cured product is formed.

Among such reactive silyl group-containing organic polymers, those whose backbone is a polyoxyalkylene polymer, a saturated hydrocarbon polymer, or a poly(meth)acrylate copolymer are disclosed in, for example, Patent Literature 1, have already been produced industrially, and are widely used in applications such as sealants, adhesives, coating materials, and paints.

Especially those having a methyldimethoxysilyl group as the terminal reactive silyl group and having a polyoxyalkylene polymer as the backbone are widely used for sealants for buildings because they have low viscosity and good moisture permeability, adhesion, and weather resistance, and the like (Non Patent Literature 1, pp. 156-157). Sealants for buildings may be required to give a low-modulus cured product capable of being highly stretched by a small amount of stress. Low modulus may be achieved by, for example, a method of using a linear polymer with a higher molecular weight such that the molecular weight between crosslinking points is increased, or a method of adding a large amount of a plasticizer. Also, sealants for buildings may be required to be in a one-component form which eliminates the need for mixing ingredients before application and thus has excellent workability. In the case of preparing a one-component sealant using a reactive silyl group-containing organic polymer, a tetravalent tin compound stable as a curing catalyst is typically used.

When a low-modulus sealant containing a tetravalent tin compound as a catalyst is used for a long period of time, especially in a joint that will greatly shrink, the sealant has unfortunately been found to have wrinkles or cracks on the surface.

These defects are presumed to be caused by the use of a tetravalent tin compound as a catalyst which reduces the recovery of the cured product so that, in the case of using the cured product in a joint that will greatly shrink, the product cannot follow the shrinkage and eventually has wrinkles or cracks, as described in Patent Literature 2 (p. 34, lines 7-6 from the bottom). Low-modulus sealants have also been found to give cured products with lower recovery to than high-modulus sealants, which is considered to be another factor causing wrinkles or cracks.

Although it has been found that wrinkles can be prevented by the use of a high-modulus sealant obtained by reducing the molecular weight between crosslinking points in the polymer or by reducing the amount of plasticizer, such a method cannot be employed in cases requiring low modulus. It has also been found that wrinkles can also be prevented by the use of a divalent tin compound or a compound other than tin instead of the tetravalent tin compound as a catalyst, but it is not always easy to achieve the same properties (e.g. curing rate, storage stability) as those of one-component sealants containing a tetravalent tin compound.

CITATION LIST

Patent Literature

Patent Literature 1: JP 2708833 B
Patent Literature 2: WO 2000-056817 A
Patent Literature 3: WO 2004-039892 A
Patent Literature 4: JP 2006-199905 A

Non Patent Literature

Non Patent Literature 1: Kenchikuyou Sealant—Kiso to Tadashii Tsukaikata—(Sealants for Buildings—Basics and Right Usage—), Japan Sealant Industry Association, Nov. 15, 1993

SUMMARY OF THE INVENTION

Technical Problem

The technical problem the present invention aims to solve is to provide a sealant that includes a reactive silyl group-containing organic polymer, and gives a cured product having a low modulus and not having wrinkles or cracks on the surface even though the sealant includes as a curing catalyst a tetravalent tin compound, which is presumed to reduce recovery.

Solution to Problem

The present inventors have found that a sealant containing an ethanol-elimination reactive silyl group as a reactive silyl group as disclosed in Patent Literature 3 and Patent Literature 4 does not cause wrinkles or cracks, and can also give a low modulus. Thus, the present invention has been completed.

Specifically, the present invention relates to the following (I) to (XVIII).

(I) A one-component curable sealant composition, including: 100 parts by weight of an organic polymer (A) having a number average molecular weight of 11,000 to 30,000, and having an ethanol-elimination reactive silyl group at a molecular terminal; 0.5 to 10 parts by weight of a tetravalent tin compound (B); and 70 to 200 parts by weight of a plasticizer (C), the organic polymer (A) including at least 10% by weight of a linear organic polymer.

(II) The one-component curable sealant composition according to item (I), wherein the ethanol-elimination reactive silyl group is a triethoxysilyl group.

(III) The one-component curable sealant composition according to item (I) or (II), wherein the tetravalent tin compound (B) is at least one of a dibutyltin compound and a dioctyltin compound.

(IV) The one-component curable sealant composition according to any one of items (I) to (III), wherein the component (A) includes at least one of a polyoxyalkylene polymer and a polyacrylate polymer as its backbone.

(V) The one-component curable sealant composition according to any one of items (I) to (IV), wherein the component (A) has a number average molecular weight of 13,000 to 25,000.

(VI) The one-component curable sealant composition according to any one of items (I) to (V), wherein the organic polymer (A) is derived from a polyoxyalkylene polymer formed by ring-opening addition polymerization of an alkylene oxide in the presence of a double metal cyanide complex catalyst.

(VII) The one-component curable sealant composition according to any one of items (I) to (VI), wherein the organic polymer (A) is a polyoxypropylene polymer.

(VIII) The one-component curable sealant composition according to any one of items (I) to (VII), wherein the organic polymer (A) has 1.0 to 2.0 ethanol-elimination reactive silyl groups per molecule on average.

(IX) The one-component curable sealant composition according to any one of items (I) to (VIII), which gives a cured product having a modulus at 100% elongation, measured by a method defined in ISO 8339, of 0.4 MPa or lower.

(X) The one-component curable sealant composition according to any one of items (I) to (IX), further including a silane coupling agent containing an ethanol-elimination reactive silyl group.

(XI) The one-component curable sealant composition according to item (X), wherein the silane coupling agent containing an ethanol-elimination reactive silyl group is a silane coupling agent containing a triethoxysilyl group.

(XII) A one-component curable sealant for buildings, including the curable sealant composition according to any one of items (I) to (XI).

(XIII) A one-component curable sealant for working joints, including the curable sealant composition according to any one of items (I) to (XI).

(XIV) A one-component curable sealant for curtain walls, including the curable sealant composition according to any one of items (I) to (XI).

(XV) A one-component curable sealant for balcony window frames, including the curable sealant composition according to any one of items (I) to (XI).

(XVI) A one-component curable sealant for stone materials, including the curable sealant composition according to any one of items (I) to (XI).

(XVII) A one-component curable sealant for bridges, including the curable sealant composition according to any one of items (I) to (XI).

(XVIII) A cured product of the one-component curable sealant composition according to any one of items (I) to (XI).

Advantageous Effects of Invention

The sealant of the present invention has the effect of providing low modulus while at the same time providing so high recovery that wrinkles or cracks are not formed even when it is used in a joint that will greatly shrink.

DESCRIPTION OF EMBODIMENTS

Hereinafter, the present invention will be described in detail.

The backbone of the organic polymer (A) containing an ethanol-leaving group within the molecule used in the present invention is not particularly limited and may be any of organic polymers having various backbones. The backbone preferably includes at least one selected from a hydrogen atom, a carbon atom, a nitrogen atom, an oxygen atom, and a sulfur atom because the resulting composition has excellent curability and adhesion.

Specific examples thereof include polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon polymers such as ethylene-propylene copolymers, polyisobutylene, copolymers of isobutylene and isoprene or like monomers, polychloroprene, polyisoprene, copolymers of isoprene or butadiene with acrylonitrile and/or styrene or like monomers, polybutadiene, and copolymers of isoprene or butadiene with acrylonitrile and styrene or like monomers, and hydrogenated polyolefin polymers obtained by hydrogenation of these polyolefin polymers; polyester polymers obtained by condensation of a dibasic acid such as adipic acid and a glycol, or by ring-opening polymerization of lactones; (meth)acrylate polymers obtained by radical polymerization of monomers such as ethyl (meth)acrylate or butyl (meth)acrylate; vinyl polymers obtained by radical polymerization of monomers such as (meth)acrylate monomers, vinyl acetate, acrylonitrile, or styrene; graft polymers obtained by polymerization of vinyl monomers in the presence of the aforementioned organic polymers; polysulfide polymers; polyamide polymers such as nylon 6 produced by ring-opening polymerization of ε-caprolactam, nylon 6/6 produced by polycondensation of hexamethylenediamine and adipic acid, nylon 6/10 produced by polycondensation of hexamethylenediamine and sebacic acid, nylon 11 produced by polycondensation of ε-aminoundecanoic acid, nylon 12 produced by ring-opening polymerization of ε-aminolaurolactam, and copolymer nylons derived from at least two species of the aforementioned nylons; polycarbonate polymers formed by, for example, polycondensation of bisphenol A and carbonyl chloride; and diallyl phthalate polymers.

Preferred among these are polyoxyalkylene polymers and (meth)acrylate polymers because these polymers have relatively low glass transition temperatures and give cured products with excellent cold resistance.

The glass transition temperature of the organic polymer (A) is not particularly limited, and is preferably 20° C. or lower, more preferably 0° C. or lower, and particularly preferably −20° C. or lower. The polymer with a glass transition temperature higher than 20° C. may have high viscosity in winter or in cold districts, resulting in poor workability. In addition, such a polymer may give a cured product with reduced flexibility and thus reduced elongation properties. The glass transition temperature values are measured by DSC.

Moreover, polyoxyalkylene polymers and (meth)acrylate polymers are particularly preferred because they have high moisture permeability, excellent depth curability in the case of being used in one-component compositions, and excellent adhesion. Polyoxyalkylene polymers are most preferred. Polyoxypropylene polymers are particularly preferred among the polyoxyalkylene polymers.

The reactive silyl group present in the organic polymer in the present invention is a group that contains a hydroxy or hydrolyzable group bonded to a silicon atom and can undergo crosslinking through the formation of a siloxane bond by a reaction accelerated by a curing catalyst. The reactive silyl group may be a group represented by formula (1):

$$-SiR^1_{3-a}X_a \qquad (1)$$

wherein each $R^1$ independently represents a C1 to C20 alkyl group, a C6 to C20 aryl group, a C7 to C20 aralkyl group, or a triorganosiloxy group represented by —OSi(R')$_3$ where each R' independently represents a C1 to C20 hydrocarbon group; each X independently represents a hydrolyzable group, typically an ethoxy group; and a represents an integer of 1 to 3.

Each X is basically an ethoxy group, but some of the a Xs may be different hydrolyzable group(s). Specific examples thereof include a hydrogen atom, a halogen atom, an alkoxy group, an acyloxy group, a ketoxymate group, an amino group, an amido group, an acid amido group, an aminooxy group, a mercapto group, and an alkenyloxy group. Preferred among these are a hydrogen atom, a methoxy group, a propoxy group, an acyloxy group, a ketoxymate group, an amino group, an amido group, an aminooxy group, a mercapto group, and an alkenyloxy group. Particularly preferred is a methoxy group, in terms of hydrolyzability.

One to three hydrolyzable or hydroxy groups can be bonded to a single silicon atom. When two or more hydrolyzable or hydroxy groups are bonded in a reactive silyl group, these groups may be the same as or differ from one another.

The numeral a in the above formula (1) is preferably 2 or 3 from the viewpoint of curability, and is preferably 3 particularly when appropriate curability is required.

Specific examples of $R^1$ in the above formula (1) include alkyl groups such as a methyl group and an ethyl group; cycloalkyl groups such as a cyclohexyl group; aryl groups such as a phenyl group; aralkyl groups such as a benzyl group; triorganosiloxy groups represented by —OSi(R')$_3$ with each R' being a group such as a methyl group or a phenyl group; a chloromethyl group; and a methoxymethyl group. A methyl group is particularly preferred among these.

More specific examples of the reactive silyl group include a triethoxysilyl group, a methyldiethoxysilyl group, and an ethyldiethoxysilyl group. A triethoxysilyl group is particularly preferred because of its good curability. These reactive silyl groups are preferred particularly because the alcohol generated along with the hydrolysis reaction of these reactive silyl groups is ethanol and thus has higher safety.

The reactive silyl group in the present invention is required to be present at a terminal of the organic polymer. This is because the organic polymer with a terminal reactive silyl group gives a cured product with a reduced modulus, thereby resulting in high elongation and high strength. Herein, a reactive silyl group that is present near a terminal of the polymer is also considered to be present at a terminal.

The reactive silyl group may be introduced by a conventionally known method. Specifically, some exemplary methods are mentioned below.

(I) An organic polymer containing a functional group such as a hydroxy group within the molecule is allowed to react with an organic compound containing an unsaturated group and an active group that is reactive with the functional group to provide an unsaturated group-containing organic polymer. Or alternatively, the functional group-containing organic polymer is allowed to copolymerize with an unsaturated group-containing epoxy compound to provide an unsaturated group-containing organic polymer. Then, the reaction product is allowed to react with a reactive silyl group-containing hydrosilane for hydrosilylation.

(II) An unsaturated group-containing organic polymer obtained in the same manner as in the method (I) is allowed to react with a compound containing a mercapto group and a reactive silyl group.

(III) An organic polymer containing a functional group such as a hydroxy group, an epoxy group, or an isocyanato group within the molecule is allowed to react with a compound containing a reactive silyl group and a functional group that is reactive with the functional group of the organic polymer.

Preferred among the methods mentioned above is the method (I), or the method (III) in which a hydroxy-terminated polymer is allowed to react with a compound containing an isocyanato group and a reactive silyl group because these methods achieve a high conversion rate in a relatively short reaction time. Moreover, particularly preferred is the method (I) because the curable sealant composition containing a reactive silyl group-containing organic polymer formed by the method (I) has lower viscosity and better workability than the curable sealant composition containing an organic polymer formed by the method (III), and also because organic polymers formed by the method (II) have a strong odor due to mercaptosilane.

Specific examples of the hydrosilane compound used in the method (I) include, but not limited to, alkoxysilanes such as triethoxysilane, methyldiethoxysilane, ethyldiethoxysilane, phenyldiethoxysilane, and 1-[2-(triethoxysilyl)ethyl]-1,1,3,3-tetramethyldisiloxane. Triethoxysilane is particularly preferred among these because of its easy availability and also because the curable sealant composition containing the resulting organic polymer has high curability, high storage stability, high elongation properties, and high tensile strength.

Examples of the synthesis method (II) include, but not limited to, a method of introducing a compound containing a mercapto group and a reactive silyl group into an unsaturated bond moiety of an organic polymer by radical addition reaction in the presence of a radical initiator and/or a radical generation source. Specific examples of the compound containing a mercapto group and a reactive silyl group include, but not limited to, γ-mercaptopropyltriethoxysilane, γ-mercaptopropylmethyldiethoxysilane, and mercaptomethyltriethoxysilane.

Examples of the synthesis method (III) in which a hydroxy-terminated polymer is allowed to react with a compound containing an isocyanato group and a reactive silyl group include, but not limited to, a method as disclosed in JP H03-47825 A. Specific examples of the compound containing an isocyanato group and a reactive silyl group include, but not limited to, γ-isocyanatopropyltriethoxysilane, γ-isocyanatopropylmethyldiethoxysilane, isocyanatomethyltriethoxysilane, and isocyanatomethyldiethoxymethylsilane.

In the case of using a silane compound in which three hydrolyzable groups are bonded to one silicon atom, such as trimethoxysilane, disproportionation may proceed. As the disproportionation proceeds, unstable compounds such as diethoxysilane may be generated, making the silane compound difficult to handle. In the case of using γ-mercaptopropyltriethoxysilane or γ-isocyanatopropyltriethoxysilane, however, such disproportionation will not proceed. Thus, the synthesis method (II) or (III) is preferred in the case that a group in which three hydrolyzable groups (e.g. triethoxysilyl groups) are bonded to one silicon atom is used as the silyl group.

In contrast, disproportionation will not proceed in the case of silane compounds represented by formula (2):

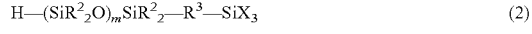

$$H—(SiR^2{}_2O)_m SiR^2{}_2—R^3—SiX_3 \quad (2)$$

wherein X is defined as mentioned above; (2 m+2) R$^2$s each independently represent a hydrocarbon group, preferably a C1 to C20 hydrocarbon group, more preferably a C1 to C8 hydrocarbon group, and particularly preferably a C1 to C4 hydrocarbon group, in terms of availability and cost; $R^3$ represents a divalent organic group, preferably a C1 to C12 divalent hydrocarbon group, more preferably a C2 to C8 divalent hydrocarbon group, and particularly preferably a C2 divalent hydrocarbon group, in terms of availability and cost; and m represents an integer of 0 to 19, preferably 1 in terms of availability and cost. For this reason, silane compounds represented by formula (2) are preferred in the case of introducing a group in which three hydrolyzable groups are bonded to one silicon atom, by the synthesis method (I). Specific examples of the silane compound represented by formula (2) include 1-[2-(triethoxysilyl)ethyl]-1,1,3,3-tetramethyldisiloxane, 1-[2-(triethoxysilyl)propyl]-1,1,3,3-tetramethyldisiloxane, and 1-[2-(triethoxysilyl)hexyl]-1,1,3,3-tetramethyldisiloxane.

The reactive silyl group-containing organic polymer (A) is required to include at least 10% by weight of a linear polymer. This is because a linear backbone better achieves the effect of providing both low modulus and high elongation. A branched polymer may be used together. In this case, the reactive silyl group-containing organic polymer (A) preferably includes 15 to 100% by weight, more preferably 50 to 100% by weight, and particularly preferably 90 to 100% by weight, of a linear organic polymer.

The number average molecular weight of the component (A), calculated from the amount of hydroxy groups, is 11,000 to 30,000, more preferably 13,000 to 25,000, and particularly preferably 14,000 to 22,000. A number average molecular weight lower than 11,000 tends to cause problems in terms of the modulus and elongation properties of the cured product, whereas a number average molecular weight higher than 30,000 provides so high viscosity that workability particularly at low temperatures can be excessively deteriorated.

In the present invention, in order to obtain a rubbery cured product having both a low modulus and high elongation and thus high recovery, the number of reactive silyl groups in the organic polymer (A) per molecule of the polymer on average is preferably 1.0 to 2.0, more preferably 1.1 to 1.8, and most preferably 1.2 to 1.6. If the number of reactive silyl groups on average in the molecule is smaller than 1.0, curability may be insufficient, making it difficult to achieve good rubber elastic behavior. Conversely, if the number of reactive silyl groups on average is greater than 2, the cured product may be hardened and thus less likely to achieve high elongation.

The polyoxyalkylene polymers mentioned above are polymers that essentially have a repeating unit represented by formula (3):

$$-R^4-O- \quad (3)$$

wherein $R^4$ represents a C1 to C14 linear or branched alkylene group. $R^4$ in formula (3) is preferably a C1 to C14, more preferably C2 to C4, linear or branched alkylene group. Specific examples of the repeating unit represented by formula (3) include —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, and —CH$_2$CH$_2$CH$_2$CH$_2$O—. The backbone of the polyoxyalkylene polymer may be formed of just one species of repeating unit or may be formed of two or more species of repeating units. Particularly in applications such as sealants, compositions containing a polymer mainly including a propylene oxide polymer are preferred because such compositions are noncrystalline and have relatively low viscosities.

Examples of the method for synthesizing a polyoxyalkylene polymer include, but not limited to, a polymerization method using an alkali catalyst such as KOH; a polymerization method using a transition metal compound-porphyrin complex catalyst such as a complex obtained by the reaction between an organoaluminum compound and a porphyrin, as disclosed in JP-A S61-215623; a polymerization method using a double metal cyanide complex catalyst, as disclosed in, for example, JP-B S46-27250, JP-B S59-15336, and U.S. Pat. Nos. 3,278,457, 3,278,458, 3,278,459, 3,427,256, 3,427,334 and 3,427,335; a polymerization method using a catalyst containing a polyphosphazene salt, as disclosed in JP-A H10-273512; and a polymerization method using a catalyst containing a phosphazene compound, as disclosed in JP-A H11-060722.

Examples of the method for producing a reactive silyl group-containing polyoxyalkylene polymer include, but not limited to, methods disclosed in JP-B S45-36319, JP-B S46-12154, JP-A S50-156599, JP-A S54-6096, JP-A S55-13767, JP-A S55-13468, JP-A S57-164123, JP-B H03-2450, U.S. Pat. Nos. 3,632,557, 4,345,053, 4,366,307, and 4,960,844, and other documents, as well as methods disclosed in JP-A S61-197631, JP-A S61-215622, JP-A S61-215623, JP-A S61-218632, JP-A H03-72527, JP-A H03-47825, and JP-A H08-231707, which can provide polyoxyalkylene polymers with high molecular weight and narrow molecular weight distribution, i.e., with a number average molecular weight of 6,000 or higher and an Mw/Mn of 1.6 or less.

The reactive silyl group-containing polyoxyalkylene polymers may be used alone or two or more of these may be used in combination.

The (meth)acrylate monomers forming the backbones of the (meth)acrylate polymers mentioned above are not particularly limited and various monomers may be used. Examples thereof include (meth)acrylate monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxy) propyltrimethoxysilane, γ-(methacryloyloxy)propyldimethoxymethylsilane, γ-(methacryloyloxy)propyltriethoxysilane, methacryloyloxymethyltrimethoxysilane, methacryloyloxymethyltriethoxysilane, methacryloyloxymethyldimethoxymethylsilane, methacryloyloxymethyldiethoxymethylsilane, and (meth)acrylic acid-ethylene oxide adducts.

The (meth)acrylate polymers include copolymers of such a (meth)acrylate monomer and any of the following vinyl monomers. Examples of the vinyl monomers include styrene monomers such as styrene, vinyltoluene, α-methylstyrene, chlorostyrene, and styrenesulfonic acid and salts thereof; silicon-containing vinyl monomers such as vinyltrimethoxysilane and vinyltriethoxysilane; maleic anhydride, maleic acid, and monoalkyl or dialkyl esters of maleic acid; fumaric acid, and monoalkyl or dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol.

These may be used alone, or a plurality of these may be copolymerized. In terms of the physical properties of the resulting product and the like, preferred among these are polymers derived from a styrene monomer or a (meth)acrylate monomer, more preferably (meth)acrylic polymers derived from an acrylate monomer or a methacrylate monomer, and particularly preferably acrylic polymers derived from an acrylate monomer. In general building applications and the like where the composition is required to have low viscosity and the cured product thereof is required to have a low modulus, high elongation, weather resistance, heat resistance, and other physical properties, butyl acrylate monomer is more preferably used. Meanwhile, in applications that require oil resistance and other properties, such as automotive applications, a copolymer mainly derived from ethyl acrylate is more preferably used. The polymer mainly derived from ethyl acrylate tends to, though having excellent oil resistance, be slightly poor in low-temperature properties (cold resistance). In order to improve the low-temperature properties, some ethyl acrylate monomers may be replaced with butyl acrylate monomers. As the proportion of butyl acrylate increases, however, its good oil resistance is correspondingly impaired. Hence, in applications requiring oil resistance, the proportion of the monomer is preferably 40% or lower, and more preferably 30% or lower. Also in order to improve low-temperature properties and other properties without impairing oil resistance, it is also preferred to use a monomer in which an oxygen atom has been introduced into a side-chain alkyl group, such as 2-methoxyethyl acrylate and 2-ethoxyethyl acrylate. However, the introduction of the alkoxy group having an ether bond at a side chain tends to cause poor heat resistance. Hence, the proportion of the monomer is preferably 40% or lower in the case where heat resistance is required for use. Thus, suitable polymers can be obtained by varying the monomer proportion in consideration of required physical properties such as oil resistance, heat resistance, or low-temperature properties, according to particular uses and requirements. Examples of polymers having an excellent balance between physical properties including oil resistance, heat resistance, and low-temperature properties include, but not limited to, copolymers of ethyl acrylate, butyl acrylate, and 2-methoxyethyl acrylate (weight ratio: 40-50/20-30/30-20). In the present invention, such a preferred monomer may be copolymerized or even block-copolymerized with another monomer. In this case, the polymer preferably includes at least 40% by weight of these preferred monomers. The term "(meth)acrylate" or similar terms as used herein refers to acrylate and/or methacrylate.

The (meth)acrylate polymer may be synthesized by any conventionally known method. However, conventional free radical polymerizations, in which a compound such as an azo compound or a peroxide is used as the polymerization initiator, have the drawback of providing polymers having a molecular weight distribution typically as large as 2 or greater and having a high viscosity. Hence, living radical polymerization is preferred in order to produce a (meth)acrylate polymer having a narrow molecular weight distribution and low viscosity, and also having a cross-linkable functional group at a molecular chain terminal at a high ratio.

A more preferred method for producing a (meth)acrylate polymer containing a specific functional group is "atom transfer radical polymerization," in which (meth)acrylate monomers are polymerized using an initiator such as an organic halide or a sulfonyl halide in the presence of a transition metal complex catalyst, among the "living radical polymerization" methods. This is because the atom transfer radical polymerization provides a polymer terminated with a halogen or like groups which are relatively advantageous to functional-group exchange reactions, and allows a high degree of freedom in terms of the designs of the initiator and the catalyst, as well as having the characteristics of the "living radical polymerization". Examples of the atom transfer radical polymerization include a method described in Matyjaszewski et al., Journal of the American Chemical Society (J. Am. Chem. Soc.), 1995, vol. 117, p. 5614.

Examples of the method for producing a reactive silyl group-containing (meth)acrylate polymer include, but not limited to, a method that involves free radical polymerization with a chain transfer agent, as disclosed in JP-B H03-14068, JP-B H04-55444, JP-A H06-211922, and other documents; and a method that involves atom transfer radical polymerization, as disclosed in JP-A H09-272714 and other documents. The reactive silyl group-containing (meth)acrylate polymers may be used alone, or two or more species thereof may be used in combination.

The reactive silyl group-containing organic polymers mentioned above may be used alone, or two or more of these may be used in combination. Specifically, an organic polymer prepared as a blend of two or more polymers selected from the group consisting of reactive silyl group-containing polyoxyalkylene polymers, reactive silyl group-containing saturated hydrocarbon polymers, and reactive silyl group-containing (meth)acrylate polymers may be used.

Examples of the method for producing an organic polymer that is a blend of a reactive silyl group-containing polyoxyalkylene polymer and a reactive silyl group-containing (meth)acrylate polymer include, but not limited to, those proposed in JP-A S59-122541, JP-A S63-112642, JP-A H06-172631, and JP-A H11-116763. A preferred exemplary specific production method is blending a reactive silyl group-containing polyoxyalkylene polymer with a copolymer which contains a reactive silyl group and whose molecular chains are substantially formed of a (meth)acrylate monomer unit containing a C1 to C8 alkyl group represented by formula (4):

$$—CH_2—C(R^5)(COOR^6)— \quad (4)$$

(wherein $R^5$ represents a hydrogen atom or a methyl group, and $R^6$ represents a C1 to C8 alkyl group) and a (meth)acrylate monomer unit containing a C9 or higher alkyl group represented by formula (5):

$$—CH_2—C(R^5)(COOR^7)— \quad (5)$$

(wherein $R^5$ is defined as mentioned above, and $R^7$ represents a C9 or higher alkyl group).

Examples of $R^6$ in the above formula (4) include C1 to C8, preferably C1 to C4, and more preferably C1 or C2 alkyl groups such as a methyl group, an ethyl group, a propyl group, an n-butyl group, a t-butyl group, and a 2-ethylhexyl group. For $R^6$s, a single alkyl group may be used alone, or two or more alkyl groups may be used in admixture.

Examples of $R^7$ in the above formula (5) include long-chain alkyl groups having 9 or more carbon atoms, typically 10 to 30 carbon atoms, preferably 10 to 20 carbon atoms, such as a nonyl group, a decyl group, a lauryl group, a tridecyl group, a cetyl group, a stearyl group, and a behenyl group. For $R^7$s, a single alkyl group may be used alone, or two or more alkyl groups may be used in admixture, as in the case of $R^6$.

The molecular chains of the (meth)acrylate polymer are substantially formed of the monomer units of formulas (4) and (5). The term "substantially" herein means that the combined amount of the monomer units of formulas (4) and (5) in the copolymer is more than 50% by weight. The combined amount of the monomer units of formulas (4) and (5) is preferably 70% by weight or more.

The ratio by weight between the monomer units of formulas (4) and (5) is preferably 95:5 to 40:60, and more preferably 90:10 to 60:40.

Examples of monomer units that may be contained in the copolymer, other than the ones of formulas (4) and (5), include monomer units derived from: acrylic acids such as acrylic acid and methacrylic acid; amide group-containing monomers such as acrylamide, methacrylamide, N-methylolacrylamide, and N-methylolmethacrylamide; epoxy group-containing monomers such as glycidyl acrylate and glycidyl methacrylate; amino group-containing monomers such as diethylaminoethyl acrylate, diethylaminoethyl methacrylate, and aminoethyl vinyl ether; and other monomers such as acrylonitrile, styrene, α-methylstyrene, alkyl vinyl ethers, vinyl chloride, vinyl acetate, vinyl propionate, and ethylene.

Some organic polymers each prepared as a blend of a reactive silyl group-containing saturated hydrocarbon polymer and a reactive silyl group-containing (meth)acrylate polymer are proposed in, for example, but not limited to, JP-A H01-168764 and JP-A 2000-186176.

Moreover, an organic polymer that is a blend with a reactive silyl group-containing (meth)acrylate polymer may also be produced by polymerization of a (meth)acrylate monomer in the presence of a reactive silyl group-containing organic polymer. Such production methods are specifically disclosed in, for example, but not limited to, JP-A S59-78223, JP-A S59-168014, JP-A S60-228516, and JP-A S60-228517.

Meanwhile, the organic polymer may contain other components such as a urethane bond-containing component in the backbone, as long as they do not greatly impair the effect of the present invention.

The urethane bond-containing component is not particularly limited, and examples thereof include groups formed by the reaction between an isocyanato group and an active hydrogen group (hereinafter, also referred to as amide segments).

The amide segments are groups represented by formula (6):

—NR$^8$—C(=O)—  (6)

wherein $R^8$ represents an organic group or a hydrogen atom.

Specific examples of the amide segment include a urethane group formed by the reaction between an isocyanato group and a hydroxy group; a urea group formed by the reaction between an isocyanato group and an amino group; and a thiourethane group formed by the reaction between an isocyanato group and a mercapto group. In the present invention, the groups of formula (6) also include groups formed by further reaction of active hydrogen in the urethane group, urea group or thiourethane group with an isocyanato group.

Examples of industrially convenient methods for the production of an organic polymer containing an amide segment and a reactive silyl group include a production method including reacting an organic polymer terminated with an active hydrogen-containing group with an excessive amount of a polyisocyanate compound to give a polymer having an isocyanato group at a terminal of the polyurethane backbone, and thereafter, or simultaneously, reacting all or a part of the isocyanato groups with the group W of a silicon compound represented by formula (7):

W—R$^9$—SiR$^1_{3-a}$X$_a$  (7)

wherein $R^1$, X and a are defined as mentioned above; $R^9$ represents a divalent organic group, preferably a C1 to C20 hydrocarbon group; W represents an active hydrogen-containing group selected from a hydroxy group, a carboxy group, a mercapto group, and a (primary or secondary) amino group. Known methods for the production of an organic polymer, in connection with this production method include ones disclosed in JP-B S46-12154 (U.S. Pat. No. 3,632,557), JP-A S58-109529 (U.S. Pat. No. 4,374,237), JP-A S62-13430 (U.S. Pat. No. 4,645,816), JP-A H08-53528 (EP 0676403), JP-A H10-204144 (EP 0831108), JP-T 2003-508561 (U.S. Pat. No. 6,197,912), JP-A H06-211879 (U.S. Pat. No. 5,364,955), JP-A H10-53637 (U.S. Pat. No. 5,756,751), JP-A H11-100427, JP-A 2000-169544, JP-A 2000-169545, JP-A 2002-212415, Japanese Patent No. 3313360, U.S. Pat. Nos. 4,067,844 and 3,711,445, and JP-A 2001-323040.

Other examples of the production methods include a method including reacting an organic polymer terminated with an active hydrogen-containing group with a reactive silyl group-containing isocyanate compound represented by formula (8):

O=C=N—R$^9$—SiR$^1_{3-a}$X$_a$  (8)

wherein $R^9$, $R^1$, X and a are defined as mentioned above. Known methods for the production of an organic polymer, in connection with this production method include ones disclosed in JP-A H11-279249 (U.S. Pat. No. 5,990,257), JP-A 2000-119365 (U.S. Pat. No. 6,046,270), JP-A S58-29818 (U.S. Pat. No. 4,345,053), JP-A H03-47825 (U.S. Pat. No. 5,068,304), JP-A H11-60724, JP-A 2002-155145, JP-A 2002-249538, WO 03/018658, and WO 03/059981.

Examples of the organic polymers terminated with an active hydrogen-containing group include hydroxy group-terminated oxyalkylene polymers (polyether polyols), polyacrylic polyols, polyester polyols, hydroxy group-terminated saturated hydrocarbon polymers (polyolefin polyols), polythiol compounds, and polyamine compounds. Polyether polyols, polyacrylic polyols, and polyolefin polyols are preferred among these because they provide organic polymers having relatively low glass transition temperatures and the cured products thereof have excellent cold resistance. Especially, polyether polyols are particularly preferred as they provide organic polymers having low viscosities and thus good workability and also having good depth curability and adhesion. Polyacrylic polyols and saturated hydrocarbon polymers are also more preferred because they provide organic polymers affording cured products with good weather resistance and heat resistance.

The polyether polyol may be prepared by any production method, and it preferably has at least 0.7 terminal hydroxy groups per molecular terminal as determined as an average of all the molecules. Specific examples thereof include oxyalkylene polymers produced with the use of a conventional alkali metal catalyst, and oxyalkylene polymers produced by reacting an alkylene oxide using an initiator having at least two hydroxy groups, such as a polyhydroxy compound, in the presence of a double metal cyanide complex or cesium.

Preferred among the polymerization methods mentioned above are the polymerization methods using a double metal cyanide complex because they can provide oxyalkylene polymers having a lower degree of unsaturation, narrow Mw/Mn, lower viscosity, high acid resistance, and high weather resistance.

Examples of the polyacrylic polyols include polyols which include an alkyl (meth)acrylate (co)polymer as its backbone and also contain a hydroxy group within the molecule. These polymers are preferably synthesized by living radical polymerization, more preferably by atom transfer radical polymerization, because these methods can provide polymers having a narrow molecular weight distribution and lower viscosity. It is also preferred to use a polymer obtained by the continuous bulk polymerization of an alkyl acrylate monomer at high temperature and high pressure, that is, by the so-called SGO process, as described in JP-A 2001-207157. Specific examples include ARUFON UH-2000 from Toagosei Co., Ltd.

Specific examples of the polyisocyanate compound mentioned above include aromatic polyisocyanates such as toluene (tolylene) diisocyanate, diphenylmethane diisocyanate, and xylylene diisocyanate; and aliphatic polyisocyanates such as isophorone diisocyanate and hexamethylene diisocyanate.

The above silicon compound of formula (7) is not particularly limited, and specific examples thereof include amino group-containing silanes such as N-cyclohexylaminomethyltriethoxysilane, and N-cyclohexylaminomethyldiethoxymethylsilane; hydroxy group-containing silanes such as γ-hydroxypropyltriethoxysilane; and mercapto group-containing silanes such as γ-mercaptopropyltriethoxysilane. Also usable as the silicon compound of formula (7) are Michael addition products prepared from various α,β-unsaturated carbonyl compounds and primary amino group-containing silanes, and Michael addition products prepared from various (meth)acryloyl group-containing silanes and primary amino group-containing compounds, as disclosed in JP-A H06-211879 (U.S. Pat. No. 5,364,955), JP-A H10-53637 (U.S. Pat. No. 5,756,751), JP-A H10-204144 (EP 0831108), JP-A 2000-169544, and JP-A 2000-169545.

The above reactive silyl group-containing isocyanate compound of formula (8) is not particularly limited, and specific examples thereof include γ-triethoxysilylpropyl isocyanate, γ-methyldiethoxysilylpropyl isocyanate, triethoxymethylsilylmethyl isocyanate, and diethoxymethylsilylmethyl isocyanate. Also usable as the reactive silyl group-containing isocyanate compound of formula (8) are compounds obtained by reacting the silicon compound of formula (7) with an excessive amount of the polyisocyanate compound mentioned above, as disclosed in JP-A 2000-119365 (U.S. Pat. No. 6,046,270).

The organic polymer obtained by the above method contains a group represented by the following formula (9) in the backbone:

—NR$^{10}$—C(=O)—      (9)

wherein R$^{10}$ represents a hydrogen atom or a substituted or unsubstituted organic group. This structure is preferred because it has a relatively high polarity, and thus tends to increase the strength of the cured product and its adhesion to substrates.

A tetravalent tin compound (B) is used as the curing catalyst (silanol condensation catalyst) in the present invention. The use of a tetravalent tin compound facilitates the preparation of a one-component curable sealant composition having an excellent curing rate and excellent storage stability. Specific examples of the component (B) include, but not limited to, tetravalent organotin compounds such as dimethyltin diacetate, dimethyltin bis(acetylacetonate), dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltin bis(octyl maleate), dibutyltin bis(tridecyl maleate), dibutyltin bis(benzyl maleate), dibutyltin diacetate, dioctyltin bis(ethyl maleate), dioctyltin bis(octyl maleate), dibutyltin dimethoxide, dibutyltin bis(nonylphenoxide), dibutyltin oxide, dibutyltin bis(acetylacetonate), dibutyltin bis(ethyl acetoacetate), reaction products of dibutyltin oxide and a silicate compound, reaction products of dibutyltin oxide and a phthalic acid ester, dioctyltin dilaurate, dioctyltin diacetate, dioctyltin bis(acetylacetonate), and reaction products of dioctyltin oxide and a silicate compound.

Preferred among these are dibutyltin compounds or dioctyltin compounds, from the viewpoints of, for example, availability, curability, and adhesion. Especially preferred are dibutyltin diacetylacetonate, dibutyltin dilaurate, dibutyltin diversatate, reaction products of dibutyltin oxide and a phthalic acid ester compound, reaction products of dibutyltin oxide and a silicate compound, and the like, because of their rapid curability. For applications which raise a concern about the burden on the environment, dioctyltin compounds such as dioctyltin diacetylacetonate, dioctyltin dilaurate, dioctyltin diversatate, reaction products of dioctyltin oxide and a phthalic acid ester compound, and reaction products of dioctyltin oxide and a silicate compound are suitable.

Curing catalysts other than the tin curing catalysts listed above may be used in combination. Specific examples thereof include titanium compounds such as tetrabutyl titanate, tetrapropyl titanate, titanium tetrakis(acetylacetonate), diisopropoxytitanium bis(acetylacetonate), and diisopropoxytitanium bis(ethyl acetoacetate); organoaluminum compounds such as aluminum tris(acetylacetonate), aluminum tris(ethyl acetoacetate), and diisopropoxyaluminum ethyl acetoacetate; and zirconium compounds such as zirconium tetrakis(acetylacetonate). Carboxylic acids and/or metal salts of carboxylic acids may also be used as the curing catalyst. In addition, amidine compounds as described in WO 2008/078654 may also be used. Examples of the amidine compounds include, but not limited to, 1-(o-tolyl)biguanide, 1-phenylguanidine, 1,2-dimethyl-1,4,5,6-tetrahydropyrimidine, 1,5,7-triazabicyclo[4.4.0]dec-5-ene, and 7-methyl-1,5,7-triazabicyclo[4.4.0]dec-5-ene.

The amount of the tetravalent tin compound (B) for each 100 parts by weight of the component (A) is 0.5 to 10 parts by weight, preferably 0.6 to 8 parts by weight, and more preferably 0.8 to 6 parts by weight. An amount less than 0.5 parts by weight results in great variations in curability. An amount more than 10 parts by weight causes so rapid curing that the composition fails to give a proper cured product, with the result that the desired properties cannot be sufficiently achieved.

The curable sealant composition of the present invention may optionally contain a carboxylic acid in an amount that does not reduce the effect of the invention.

Examples of carboxylic acids that can be used as the promoter include, but not limited to, linear saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid, and lacceric acid; monoene unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselinic acid, oleic acid, elaidic acid, asclepinic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid, and 10-undecenoic acid; polyene unsaturated fatty acids such as linoelaidic acid, linolic acid, 10,12-octadecadienoic acid, hiragonic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, nisinic acid, and docosahexaenoic acid; branched fatty acids such as 1-methylbutyric acid, isobutyric acid, 2-ethylbutyric acid, isovaleric acid, tuberculostearic acid, pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, and versatic acid; triple bond-containing fatty acids such as propiolic acid, tariric acid, stearolic acid, crepenynic acid, ximenynic acid, and 7-hexadecynoic acid; alicyclic carboxylic acids such as naphthenic acid, malvalic acid, sterculic acid, hydnocarpic acid, chaulmoogric acid, gorlic acid, 1-methylcyclopentanecarboxylic acid, 1-methylcyclohexanecarboxylic acid, 2-methylbicyclo[2.2.1]-5-heptene-2-carboxylic acid, 1-adamantanecarboxylic acid, bicyclo[2.2.1]heptane-1-carboxylic acid, and bicyclo[2.2.2]octane-1-carboxylic acid; oxygen-containing fatty acids such as acetoacetic acid, ethoxyacetic acid, glyoxylic acid, glycolic acid, gluconic acid, sabinic acid, 2-hydroxytetradecanoic acid, ipurolic acid, 2,2-dimethyl-3-hydroxypropionic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinoleic acid, camlolenic acid, licanic acid, pheronic acid, cerebronic acid, and 2-methyl-7-oxabicyclo[2.2.1]-5-heptene-2-carboxylic acid; and halogen-substituted monocarboxylic acids such as chloroacetic acid, 2-chloroacrylic acid, and chlorobenzoic acid.

Examples of aliphatic dicarboxylic acids include saturated dicarboxylic acids such as adipic acid, azelaic acid, pimelic acid, suberic acid, sebacic acid, ethylmalonic acid, glutaric acid, oxalic acid, malonic acid, succinic acid, oxydiacetic acid, dimethylmalonic acid, ethylmethylmalonic acid, diethylmalonic acid, 2,2-dimethylsuccinic acid, 2,2-diethylsuccinic acid, 2,2-dimethylglutaric acid, and 1,2,2-trimethyl-1,3-cyclopentanedicarboxylic acid; and unsaturated dicarboxylic acids such as maleic acid, fumaric acid, acetylenedicarboxylic acid, and itaconic acid.

Examples of aliphatic polycarboxylic acids include tricarboxylic acids such as aconitic acid, 4,4-dimethylaconitic acid, citric acid, isocitric acid, and 3-methylisocitric acid. Examples of aromatic carboxylic acids include aromatic monocarboxylic acids such as benzoic acid, 9-anthracenecarboxylic acid, atrolactic acid, anisic acid, isopropylbenzoic acid, salicylic acid, and toluic acid; and aromatic polycarboxylic acids such as phthalic acid, isophthalic acid, terephthalic acid, carboxyphenylacetic acid, and pyromellitic acid. The combined use of these carboxylic acids is expected to increase the catalytic activity of the curing agent, and thus to improve the curability, depth curability, and the like of the curable sealant composition.

The amount of the carboxylic acid to be added for each 100 parts by weight of the polymer (A) is preferably 0.01 to 20 parts by weight, and more preferably 0.1 to 10 parts by weight.

The curable sealant composition of the present invention may optionally contain an amine compound in an amount that does not reduce the effect of the invention.

Specific examples of the amine compound include, but not limited to, aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine and oleylamine; aromatic amines such as laurylaniline, stearylaniline, and triphenylamine; and other amines such as monoethanolamine, diethanolamine, triethanolamine, 3-hydroxypropylamine, diethylenetriamine, triethylenetetramine, benzylamine, 3-methoxypropylamine, 3-lauryloxypropylamine, 3-dimethylaminopropylamine, 3-diethylaminopropylamine, xylylenediamine, ethylenediamine, hexamethylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5,4,0)undecene-7 (DBU), and 1,5-diazabicyclo(4,3,0)nonene-5 (DBN).

Primary amines such as octylamine and laurylamine are preferred among these because of their high promoter activity, and amine compounds containing a hydrocarbon group with at least one hetero atom are also preferred. This hetero atom may be, for example, but not limited to, N, O, or S. Examples of such amine compounds include those mentioned above as the other amines. More preferred are amine compounds containing a hydrocarbon group with a hetero atom on a carbon atom at position 2 or 4. Examples of such amine compounds include ethylenediamine, ethanolamine, dimethylaminoethylamine, diethylaminoethylamine, 3-hydroxypropylamine, diethylenetriamine, 3-methoxypropylamine, 3-lauryloxypropylamine, N-methyl-1,3-propanediamine, 3-dimethylaminopropylamine, 3-diethylaminopropylamine, 3-(1-piperazinyl)propylamine, and 3-morpholinopropylamine. More preferred among these are 3-diethylaminopropylamine and 3-morpholinopropylamine, because of their high promoter activity. Particularly preferred is 3-diethylaminopropylamine because it provides good adhesion, workability, and storage stability to water-proof coating film materials. Also, the use of an amine compound containing a long-chain alkyl group or an amine compound having a melting point of 30° C. or higher allows the cured product to have a matte surface and also to have no stickiness, with the result that dust and dirt are less likely to be attached, and therefore good appearance can be maintained for a long period of time. Suitable examples of such an amine compound include laurylamine, stearylamine, and hexamethylenediamine, because of their significant effects.

The amount of the amine compound for each 100 parts by weight of the component (A) is preferably about 0.01 to 5 parts by weight, and more preferably 0.1 to 4 parts by weight. Less than 0.01 parts by weight of the amine compound may result in reduced curing rate and may also not easily allow the curing reaction to sufficiently proceed. More than 5 parts by weight of the amine compound tends to excessively shorten pot life, deteriorating workability; besides, such an amount may decrease curing rate, contrary to the intention.

In the present invention, a plasticizer (C) is used to obtain a cured product having a low modulus. The plasticizer has the function of adjusting the viscosity or slump properties of the curable sealant composition, and the function of adjusting the mechanical properties of the resulting cured product, such as tensile strength and elongation properties.

Examples of the plasticizers include, but not limited to, phthalic acid esters such as dibutyl phthalate, diheptyl phthalate, bis(2-ethylhexyl)phthalate, and butyl benzyl phthalate; nonaromatic dibasic acid esters such as dioctyl adipate, dioctyl sebacate, dibutyl sebacate, and isodecyl succinate; cyclohexanedicarboxylic acid esters such as diisononyl cyclohexanedicarboxylate and bis(2-ethylhexyl) cyclohexanedicarboxylate; aliphatic esters such as butyl oleate and methyl acetyl ricinolate; phosphoric acid esters such as tricresyl phosphate and tributyl phosphate; trimellitic acid esters; chlorinated paraffins; hydrocarbon oils such as alkyl diphenyls and partially hydrogenated terphenyls; process oils; and epoxy plasticizers such as epoxidized soybean oil and benzyl epoxystearate. Moreover, cyclohexanedicarboxylates obtained by hydrogenating the above phthalic acid esters can be used without concerns about safety. Such a plasticizer is marketed by BASF under the trade name Hexamoll DINCH and is easily available.

A polymer plasticizer containing a polymer component within the molecule is preferably added because, for example, the initial properties of the resulting cured product can be maintained for a long period of time, and the drying properties (or coating properties) of an alkyd coating material applied to the cured product can also be improved. Examples of the polymer plasticizers include, but not limited to, vinyl polymers obtained by polymerizing vinyl monomers by various methods; esters of polyalkylene glycols, such as diethylene glycol dibenzoate, triethylene glycol dibenzoate, and pentaerythritol esters; polyester plasticizers prepared from dibasic acids (e.g. sebacic acid, adipic acid, azelaic acid, phthalic acid) and divalent alcohols (e.g. ethylene glycol, diethylene glycol, triethylene glycol, propylene glycol, dipropylene glycol); polyether polyols (e.g. polyethylene glycol, polypropylene glycol, polytetramethylene glycol) which have a molecular weight of 500 or higher, or even of 1,000 or higher, and polyether derivatives obtained by converting the hydroxy groups of these polyether polyols into ester groups, ether groups or other groups; polystyrenes such as polystyrene and poly-α-methylstyrene; polybutadiene, polybutene, polyisobutylene, polybutadiene-acrylonitrile, and polychloroprene.

Preferred among these polymer plasticizers are those having high compatibility with the organic polymer (A), such as polyethers and vinyl polymers. Polyethers, particularly polypropylene glycol, are also more preferred because the resulting curable sealant composition has good surface curability and depth curability and exhibits no curing retardation after storage.

Vinyl polymers are preferred because they have high compatibility with the organic polymer (A) and the resulting cured products have good weather resistance and heat resistance. More preferred among these are acrylic polymers and/or methacrylic polymers, with acrylic polymers such as polyalkyl acrylates being particularly preferred.

The method for producing a polyalkyl acrylate is not particularly limited, and is preferably living radical polymerization, and more preferably atom transfer radical polymerization, because these methods can provide polymers having a narrow molecular weight distribution and lower viscosity. Particularly preferred is what is called the SGO process including the continuous bulk polymerization of an alkyl acrylate compound at high temperature and high pressure, as disclosed in, for example, JP-A 2001-207157.

The number average molecular weight of the polymer plasticizer may be 500 to 15000, preferably 800 to 10000, more preferably 1000 to 8000, particularly preferably 1000 to 5000, and most preferably 1000 to 3000. A polymer plasticizer having a very low molecular weight may bleed out over time from the resulting cured product due to heat or rain, which may make it impossible for the product to maintain the initial physical properties for a long period of time, and thus may cause contamination such as attachment of dust. In addition, the use of such a polymer plasticizer tends to provide inferior alkyd coating properties. Conversely, a polymer plasticizer having a very high molecular weight tends to give high viscosity to the curable sealant composition, deteriorating workability.

The molecular weight distribution of the polymer plasticizer is not particularly limited, and is preferably narrow. The molecular weight distribution may be less than 1.80, and is preferably 1.70 or less, more preferably 1.60 or less, still more preferably 1.50 or less, particularly preferably 1.40 or less, and most preferably 1.30 or less.

The number average molecular weight of the polymer plasticizer is measured by terminal group analysis in the case of polyether polymers, and by GPC in the case of other polymers. Moreover, the molecular weight distribution (Mw/Mn) is measured by GPC (relative to polystyrene standards).

The polymer plasticizer may or may not contain a reactive silyl group within the molecule. The polymer plasticizer preferably contains a reactive silyl group because, in this case, the polymer plasticizer added is involved in the curing reaction, which leads to prevention of the transfer of the plasticizer from the resulting cured product.

The polymer plasticizer containing a reactive silyl group is preferably a compound having 1 or less, more preferably 0.8 or less reactive silyl groups per molecule on average. In the case of adding a plasticizer containing a reactive silyl group, especially an oxyalkylene polymer containing a reactive silyl group, the number average molecular weight of the plasticizer is preferably smaller than that of the organic polymer (A), in terms of achieving a sufficient plasticizing effect.

The plasticizers may be used alone or multiple kinds of the plasticizers may be used in combination. Also, a low-molecular-weight plasticizer and a polymer plasticizer may be used in combination. These plasticizers may be added during the production of the organic polymer (A).

In the case of adding a plasticizer, the amount thereof for each 100 parts by weight of the organic polymer (A) is preferably 5 to 150 parts by weight, more preferably 10 to 120 parts by weight, and particularly preferably 20 to 100 parts by weight. Less than 5 parts by weight of the plasticizer tends not to exert its effect, whereas more than 150 parts by weight of the plasticizer tends to cause the cured product to have insufficient mechanical strength.

The curable sealant composition of the present invention may optionally contain a silane coupling agent. The "silane coupling agent" refers to a compound that contains a hydrolyzable silyl group and another functional group within the molecule, and, when used in the curable sealant composition, exhibits the effect of improving the adhesion of the resulting cured product to various adherends, and the (dehydration) effect of removing moisture in the curable sealant composition. Also, the silane coupling agent is a compound that is capable of functioning as, for example, a physical property modifier or a dispersibility improving agent for inorganic filler, as well as having the above effects.

The hydrolyzable silyl group in the silane coupling agent may be a hydrolyzable group, specifically a group as mentioned above as the hydrolyzable group in the organic polymer (A). Preferred among these are a methoxy group, an ethoxy group, and the like, because of their moderate hydrolyzing rates. The number of hydrolyzable groups per molecule of the silane coupling agent is preferably 2 or more, and particularly preferably 3 or more.

Examples of the functional groups other than hydrolyzable silyl groups in the silane coupling agent include a substituted or unsubstituted amino group, a mercapto group, an epoxy group, a carboxyl group, a vinyl group, an isocyanato group, an isocyanurate group, and a halogen. Particularly preferred among these are silane coupling agents containing a substituted or unsubstituted amino group, from the viewpoint of increasing the adhesion of the resulting cured product to adherends.

A curable sealant composition obtained by adding the silane coupling agent to the organic polymer (A) containing a reactive silyl group can be prevented, for example, from increasing in viscosity with time, and thus can be stored for a long period of time in good conditions.

Examples of the silane coupling agents include, but not limited to, amino silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl) aminopropyltrimethoxysilane, γ-(2-aminoethyl)aminopropylmethyldimethoxysilane, γ-(2-aminoethyl)aminopropyltriethoxysilane, γ-(2-aminoethyl) aminopropylmethyldiethoxysilane, γ-(2-aminoethyl) aminopropyltriisopropoxysilane, γ-(2-(2-aminoethyl) aminoethyl)aminopropyltrimethoxysilane, γ-(6-aminohexyl)aminopropyltrimethoxysilane, 3-(N-ethylamino)-2-methylpropyltrimethoxysilane, 2-aminoethylaminomethyltrimethoxysilane, N-cyclohexylaminomethyltriethoxysilane, N-cyclohexylaminomethyldiethoxymethylsilane, γ-ureidopropyltrimethoxysilane, γ-ureidopropyltriethoxysilane, N-phenyl-γ-aminopropyltrimethoxysilane, N-phenylaminomethyltrimetoxysilane, N-benzyl-γ-aminopropyltrimethoxysilane, N-vinylbenzyl-γ-aminopropyltriethoxysilane, N-(3-triethoxysilylpropyl)-4,5-dihydroimidazole, N-cyclohexylaminomethyltriethoxysilane, N-cyclohexylaminomethyldiethoxymethylsilane, N-phenylaminomethyltrimetoxysilane, (2-aminoethyl)aminomethyltrimethoxysilane, and N,N'-bis[3-(trimethoxysilyl)propyl]ethylenediamine; ketimine silanes such as N-(1,3-dimethylbutylidene)-3-(triethoxysilyl)-1-propaneamine; isocyanate silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl)trimethoxysilane, and (isocyanatemethyl)dimethoxymethylsilane; mercapto silanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane, and mercaptomethyltriethoxysilane; epoxy silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxy silanes such as β-carboxyethyltriethoxysilane, β-carboxyethylphenylbis (2-methoxyethoxy)silane, and N-β-(carboxymethyl)aminoethyl-γ-aminopropyltrimethoxysilane; vinylically unsaturated group-containing silanes such as vinyltrimethoxysilane, vinyltriethoxysilane, γ-methacryloyloxypropylmethyldimethoxysilane, γ-acryloyloxypropyltriethoxysilane, and methacryloyloxymethyltrimethoxysilane; halogen-containing silanes such as γ-chloropropyltrimethoxysilane; and isocyanurate silanes such as tris(3-trimethoxysilylpropyl)isocyanurate. Also usable are reaction products of an amino silane and an epoxy silane, or of an amino silane and an isocyanate silane as mentioned above, and the like. Condensates obtained by partially condensing these silanes may also be used. Derivatives obtained by modifying these silanes, such as amino-modified silyl polymers, silylated amino polymers, unsaturated amino silane complexes, phenylamino long-chain-alkyl silanes, aminosilylated silicones, and silylated polyesters, may also be used as the silane coupling agent.

Particularly preferred among these silane coupling agents are γ-aminopropyltrimethoxysilane, γ-(2-aminoethyl) aminopropyltrimethoxysilane, and vinyltrimetoxysilane, in terms of compatibility and availability. In the case where the curable sealant composition of the present invention, which contains as the component (A) the organic polymer containing an ethanol-elimination reactive silyl group, further contains a silane coupling agent containing a methoxysilyl group, the one-component curable sealant composition, when stored in the coexistence of a curing catalyst, may undergo an ester exchange reaction between an ethoxy group and a methoxy group, which may change the reactivity to increase curability especially after storage. Particularly in the case of using a vinyl silane and an amino silane, each containing a trimethoxysilyl group, the skin formation time after storage tends to be shortened compared to that in the initial stage. In order to improve the skin formation time, it is desirable to select at least one silane coupling agent containing a triethoxysilyl group. Particularly, a combination of triethoxyvinylsilane and trimethoxyaminosilane is preferred because then the rate of increase in the viscosity after storage is low and the change in surface curability between before and after storage is small.

One kind of silane coupling agent or a combination of multiple kinds of silane coupling agents may be added to the curable sealant composition. To prevent changes in the surface curability of the curable sealant composition during storage, it is preferable to select a silane coupling agent containing a hydrolyzable group of the same structure as the hydrolyzable group in the organic polymer (A). Specifically, a silane coupling agent with a methoxysilyl group is selected in the case that the hydrolyzable silyl group of the organic polymer (A) is a methoxysilyl group; and a silane coupling agent with an ethoxysilyl group is selected in the case that the hydrolyzable silyl group of the organic polymer (A) is an ethoxysilyl group.

In the case of adding a silane coupling agent, the amount thereof for each 100 parts by weight of the organic polymer (A) is preferably 0.01 to 20 parts by weight, more preferably 0.1 to 10 parts by weight, and particularly preferably 1 to 7 parts by weight. Less than 0.01 parts by weight of the silane coupling agent tends to give inferior storage stability to the curable sealant composition, and to give inferior adhesion to the resulting cured product. Conversely, an amount more than 20 parts by weight tends not to achieve practical depth curability.

The curable sealant composition of the present invention may optionally contains, for example, an epoxy resin, a phenol resin, sulfur, an alkyl titanate, or an aromatic polyisocyanate in order to provide an adhesion-imparting effect. These may be used alone or two or more of these may be used in combination. Epoxy resins, however, tend to reduce the catalytic activity of guanidine compounds as the amount added increases; therefore, the amount of the epoxy resin is preferably small. In the case of adding an epoxy resin, the amount thereof for each 100 parts by weight of the organic polymer (A) is preferably 5 parts by weight or less, more preferably 0.5 parts by weight or less, and particularly preferably substantially zero.

The composition of the present invention may contain a silicate. This silicate serves as a crosslinking agent and thus is capable of improving the recovery, durability, and creep resistance of the organic polymer (A) in the present invention. In addition, the silicate also has the effects of improving adhesion, water-resistant adhesion, and the bond durability under high temperature and humidity conditions. The silicate may be a tetraalkoxysilane or a partially hydrolyzed condensate thereof. When a silicate is used, the amount thereof for each 100 parts by weight of the organic polymer (A) is 0.1 to 8 parts by weight, preferably 0.5 to 3 parts by weight. The amount of the silicate used is preferably small, and most preferably zero, because silicates tend to increase the modulus of the cured product and decrease the elongation.

Specific examples of the silicates include tetraalkoxysilanes (tetraalkyl silicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, and tetra-t-butoxysilane, and partially hydrolyzed condensates thereof.

Partially hydrolyzed condensates of tetraalkoxysilanes are more preferred because they are more effective in improving the recovery, durability, and creep resistance in the present invention than tetraalkoxysilanes.

Examples of the partially hydrolyzed condensates of tetraalkoxysilanes include those obtained by adding water to a tetraalkoxysilane and performing partial hydrolysis and condensation in a conventional manner. Commercially available partially hydrolyzed condensates of organosilicate compounds may be used. Examples of such condensates include Methyl Silicate 51 and Ethyl Silicate 40 (both from COLCOAT CO., LTD.).

The curable sealant composition of the present invention may optionally contain a physical property modifier to modify the tensile properties of the resulting cured product. Examples of the physical property modifiers include, but not limited to, alkylalkoxysilanes such as methyltrimethoxysilane, dimethyldimethoxysilane, trimethylmethoxysilane, and n-propyltrimethoxysilane; alkylisopropenoxysilanes such as dimethyldiisopropenoxysilane, methyltriisopropenoxysilane, and γ-glycidoxypropylmethyldiisopropenoxysilane, and functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, and γ-mercaptopropylmethyldimethoxysilane; silicone varnishes; and polysiloxanes. The use of such a physical property modifier makes it possible to increase the hardness when the composition of the present invention is cured, or conversely reduce the hardness to enhance elongation at break. The physical property modifiers may be used alone or two or more of them may be used in combination.

In particular, compounds that generate a compound containing a monovalent silanol group within the molecule by hydrolysis serve to decrease the modulus of the cured product without deteriorating the stickiness condition on the surface of the cured product. Particularly preferred are compounds generating trimethylsilanol. Examples of the compounds that generate a compound containing a monovalent silanol group within the molecule by hydrolysis include compounds disclosed in JP-A H05-117521. Other examples include compounds generating silicon compounds that are derivatives of alkyl alcohols (e.g. hexanol, octanol, decanol), and generate $R_3SiOH$ (e.g. trimethylsilanol) by hydrolysis; and compounds disclosed in JP-A H11-241029 which generate silicon compounds that are derivatives of polyalcohols each having three or more hydroxy groups (e.g. trimethylolpropane, glycerol, pentaerythritol, sorbitol), and generate $R_3SiOH$ (e.g. trimethylsilanol) by hydrolysis.

Still other examples include compounds as disclosed in JP-A H07-258534 which generate silicon compounds that are derivatives of oxypropylene polymers and generate $R_3SiOH$ (e.g. trimethylsilanol) by hydrolysis; and polymers disclosed in JP-A H06-279693 which contain a cross-linkable reactive silyl group and a silyl group capable of forming a monosilanol-containing compound by hydrolysis.

The physical property modifier is used in an amount of 0.1 to 20 parts by weight, preferably 0.5 to 10 parts by weight, for each 100 parts by weight of the component (A).

In the present invention, a compound having an α,β-diol structure or an α,γ-diol structure within the molecule may be added. The "α,β-diol structure" represents a structure having two hydroxy groups on adjacent carbon atoms. The "α,γ-diol structure" represents a structure having two hydroxy groups on adjacent carbon atoms between which a single carbon atom intervenes. Such compounds include polyols (e.g. triols and tetraols, typically glycerol) which have both the α,β-diol structure and the α,γ-diol structure or either one of these structures. These compounds are preferred because they decrease the modulus of the curable sealant composition and increase the elongation. Moreover, surface curability, which in some cases may change after storage, can be improved by the use of such a compound, and thus in this respect, the compound is preferably used together.

The compound having an α,β-diol structure or an α,γ-diol structure within the molecule is not particularly limited, and examples thereof include: diols such as ethylene glycol, propylene glycol, 1,3-propanediol, 1,2-butanediol, 1,3-butanediol, 2,3-butanediol, pinacol, 2,2-dimethyl-1,3-propanediol, and 2-methyl-2-hydroxymethyl-1,3-propanediol; triols such as glycerol, 1,2,6-hexanetriol, 1,1,1-tris(hydroxymethyl)propane, and 2,2-bis(hydroxymethyl)butanol; tetravalent or higher valent polyols such as pentaerythritol, D-sorbitol, D-mannitol, diglycerol, and polyglycerol; glycerol monocarboxylic acid esters such as glycerol monostearate, glycerol monoisostearate, glycerol monooleate, glycerol monolaurate, glycerol monopalmitate, glycerol monocaprylate, glycerol monoacetate, and glycerol monobehenate; polyglycerol carboxylic acid esters such as diglycerol monostearate, diglycerol monooleate, diglycerol monolaurate, tetraglycerol monostearate, tetraglycerol monooleate, tetraglycerol monolaurate, tetraglycerol distearate, tetraglycerol dioleate, tetraglycerol dilaurate, decaglycerol monostearate, decaglycerol monooleate, decaglycerol monolaurate, decaglycerol distearate, decaglycerol dioleate, and decaglycerol dilaurate; pentaerythritol monocarboxylic acid esters such as pentaerythritol monostearate, pentaerythritol monoisostearate, pentaerythritol monooleate, and pentaerythritol monolaurate; pentaerythritol dicarboxylic acid esters such as pentaerythritol distearate, pentaerythritol dioleate, and pentaerythritol dilaurate; sorbitan monocarboxylic acid esters such as sorbitan monostearate, sorbitan monooleate, sorbitan monolaurate, sorbitan monopalmitate, and sorbitan monobehenate; sorbitan dicarboxylic acid esters such as sorbitan distearate, sorbitan dioleate, sorbitan dilaurate, sorbitan dipalmitate, and sorbitan dibehenate; glycerol monoalkyl ethers such as glycerol monostearyl ether, glycerol monooleyl ether, glycerol monolauryl ether, and glycerol mono-2-ethylhexyl ether; polyglycerol alkyl ethers such as diglycerol monostearyl ether, diglycerol monooleyl ether, diglycerol monolauryl ether, tetraglycerol monostearyl ether, tetraglycerol monooleyl ether, tetraglycerol monolauryl ether, tetraglycerol distearyl ether, tetraglycerol dioleyl ether, tetraglycerol dilauryl ether, decaglycerol monostearyl ether, decaglycerol monooleyl ether, decaglycerol monolauryl ether, decaglycerol distearyl ether, decaglycerol dioleyl ether, and decaglycerol dilauryl ether; pentaerythritol monoalkyl ethers such as pentaerythritol monostearyl ether, pentaerythritol monooleyl ether, and pentaerythritol monolauryl ether; pentaerythritol dialkyl ethers such as pentaerythritol distearyl ether, pentaerythritol dioleyl ether, and pentaerythritol dilauryl ether; sorbitan monoalkyl ethers such as sorbitan monostearyl ether, sorbitan monooleyl ether, and sorbitan monolauryl ether; and sorbitan dialkyl ethers such as sorbitan distearyl ether, sorbitan dioleyl ether, and sorbitan dilauryl ether.

Most of the compounds mentioned above are general-purpose compounds used as an emulsifier, a surfactant, a dispersant, a defoaming agent, an antifogger, a solubilizing agent, a thickener, or a lubricant, and are easily available.

Preferred among the above compounds are triols, glycerol monocarboxylic acid esters, pentaerythritol monocarboxylic acid esters, and glycerol monoalkyl ethers because they are easily available and highly safe, and contribute to achieving the effect of the present invention well. Particularly, triols and glycerol monocarboxylic acid esters are preferred, and glycerol monocarboxylic acid esters are more preferred. Particularly suitable are stearyl monoglyceride, oleyl monoglyceride, and lauryl monoglyceride.

These compounds having a diol structure may be used alone, or two or more of these may be used in combination. The amount of the compound having a diol structure to be used for each 100 parts by weight of the organic polymer (A) is preferably 0.2 to 20 parts by weight, more preferably 0.5 to 10 parts by weight, and particularly preferably 1 to 5 parts by weight. An amount less than 0.2 parts by weight tends not to achieve the desired effect, whereas an amount more than 20 parts by weight tends to decrease the adhesion of the cured product, which is thus not preferred.

An antioxidant (age resister) may be used in the composition provided by the present invention. The use of an antioxidant can enhance the heat resistance of the cured product. Examples of the antioxidants include hindered phenol antioxidants, monophenol antioxidants, bisphenol antioxidants, and polyphenol antioxidants. Particularly preferred are hindered phenol antioxidants. Examples also include the following hindered amine light stabilizers: TINUVIN 622LD, TINUVIN 144, CHIMASSORB 944LD, and CHIMASSORB 119FL (all are products of BASF Japan Ltd.); MARK LA-57, MARK LA-62, MARK LA-67, MARK LA-63, and MARK LA-68 (all are products of ADEKA CORPORATION); and SANOL LS-770, SANOL LS-765, SANOL LS-292, SANOL LS-2626, SANOL LS-1114, and SANOL LS-744 (all are products of Sankyo Lifetech Co., Ltd.). Other specific examples of the antioxidant include those described in JP-A H04-283259 and JP-A H09-194731. The amount of the antioxidant to be used for each 100 parts by weight of the component (A) is preferably 0.1 to 10 parts by weight, and more preferably 0.2 to 5 parts by weight.

A light stabilizer may be used in the composition provided by the present invention. The use of a light stabilizer can prevent the photooxidative degradation of the cured product. Examples of the light stabilizers include benzotriazole compounds, hindered amine compounds, and benzoate compounds. Particularly preferred are hindered amine compounds. The amount of the light stabilizer to be used for each 100 parts by weight of the component (A) is preferably 0.1 to 10 parts by weight, and more preferably 0.2 to 5 parts by weight. Other specific examples of the light stabilizer include those described in JP-A H09-194731.

When a photo-curable substance, in particular an unsaturated acrylic compound, is combined in the composition provided by the present invention, a tertiary amine-containing hindered amine light stabilizer is preferably used as the hindered amine light stabilizer in order to improve the storage stability of the composition, as described in JP-A H05-70531. Examples of the tertiary amine-containing hindered amine light stabilizers include light stabilizers such as TINUVIN 622LD, TINUVIN 144, and CHIMASSORB 119FL (all are products of BASF Japan Ltd.); MARK LA-57, LA-62, LA-67, and LA-63 (all are products of ADEKA CORPORATION); and SANOL LS-765, LS-292, LS-2626, LS-1114, and LS-744 (all are products of BASF Japan Ltd.).

An ultraviolet absorber may be used in the composition provided by the present invention. The use of an ultraviolet absorber makes it possible to increase the surface weather resistance of the cured product. Examples of the ultraviolet absorbers include benzophenone compounds, benzotriazole compounds, salicylate compounds, substituted tolyl compounds, and metal chelating compounds. Particularly preferred are benzotriazole compounds. The amount of the ultraviolet absorber to be used for each 100 parts by weight of the component (A) is preferably 0.1 to 10 parts by weight, and more preferably 0.2 to 5 parts by weight. A phenol or hindered phenol antioxidant, a hindered amine light stabilizer, and a benzotriazole ultraviolet absorber are preferably used in combination.

The composition of the present invention may contain a photo-curable substance. The use of a photo-curable substance results in the formation of a layer of the photo-curable substance on the surface of the cured product, thereby improving the properties of the cured product in terms of stickiness and weather resistance. The photo-curable substance refers to a substance that undergoes chemical changes in molecular structure such that changes in physical properties such as curing can be caused in a considerably short period of time by action of light. Such substances include many known compounds such as organic monomers, oligomers, resins, and compositions containing any of them, and any commercially available ones can be used. Typical examples include unsaturated acrylic compounds, polyvinyl cinnamates, and azidized resins. Examples of the unsaturated acrylic compounds include monomers having a single or multiple acrylic or methacrylic unsaturated groups, oligomers thereof, and mixtures thereof. For example, monomers such as propylene (or butylene or ethylene) glycol di(meth)acrylate, and neopentyl glycol di(meth)acrylate, and their oligoesters with a molecular weight of 10,000 or lower may be mentioned. Specific examples thereof include the special acrylates such as (difunctional) Aronix M-210, Aronix M-215, Aronix M-220, Aronix M-233, Aronix M-240 and Aronix M-245; (trifunctional) Aronix M-305, Aronix M-309, Aronix M-310, Aronix M-315, Aronix M-320 and Aronix M-325; and (polyfunctional) Aronix M-400. In particular, acrylic functional group-containing compounds are preferred, and compounds having 3 or more acrylic functional groups per molecule on average are also preferred (all Aronix products available from Toagosei Co., Ltd.).

Examples of the polyvinyl cinnamates include photosensitive resins with cinnamoyl groups functioning as photosensitive groups, such as those obtained by esterification of polyvinyl alcohol with cinnamic acid, as well as many derivatives of polyvinyl cinnamate. Azidized resins are known as photosensitive resins with azide groups functioning as photosensitive groups, and include photosensitive rubber solutions typically containing a diazide compound as a photosensitizer. Detailed examples of the resins are also described in "Kankosei Jushi (Photosensitive Resins)" (published on Mar. 17, 1972 by Insatsu Gakkai Shuppanbu Ltd., p. 93 ff., p. 106 ff., and p. 117 ff.). These may be used alone or may be mixed, optionally together with a sensitizer added thereto. In some cases, the addition of a sensitizer (e.g. ketones, nitro compounds) or an accelerator (e.g. amines) enhances the effect. The photo-curable substance is preferably used in an amount of 0.1 to 20 parts by weight, more preferably 0.5 to 10 parts by weight, for each 100 parts by weight of the component (A). An amount of 0.1 parts by weight or less tends not to provide the effect of enhancing weather resistance, whereas an amount of 20 parts by weight or more tends to make the resulting cured product so hard that cracking can be caused.

The composition of the present invention may contain an oxygen-curable substance. Examples of the oxygen-curable substances include unsaturated compounds that can react with oxygen in the air, and these compounds serve to, for example, prevent surface stickiness and the attachment of dirt or dust to the surface of the cured product by reacting with oxygen in the air to form a cured layer around the surface of the cured product. Specific examples of the oxygen-curable substance include drying oils such as tung oil and linseed oil, and various alkyd resins obtained by modification of these compounds; and drying oil-modified acrylic polymers, epoxy resins, and silicone resins; liquid polymers such as 1,2-polybutadiene, 1,4-polybutadiene and polymers of C5-C8 dienes, which are obtainable by polymerizing or copolymerizing diene compounds (e.g. butadiene, chloroprene, isoprene, and 1,3-pentadiene), liquid copolymers such as NBR and SBR, which are obtainable by copolymerizing the diene compound and a monomer copolymerizable therewith (e.g. acrylonitrile, styrene) such that the diene compound serves as the main component, and various modified products thereof (e.g. maleate-modified products, boiled-oil-modified products). These may be used alone, or two or more of these may be used in combination. Particularly preferred among these are tung oil and liquid diene polymers. The combined use with a catalyst or metal dryer for promoting the oxidative curing reaction can enhance the effect in some cases. Examples of the catalysts and metal dryers include metal salts such as cobalt naphthenate, lead naphthenate, zirconium naphthenate, cobalt octylate, and zirconium octylate, and amine compounds. The amount of the oxygen-curable substance is preferably 0.1 to 20 parts by weight, and more preferably 0.5 to 10 parts by weight, for each 100 parts by weight of the component (A). An amount less than 0.1 parts by weight tends to result in an insufficient improvement of stain resistance, whereas an amount more than 20 parts by weight tends to impair the properties of the cured product in terms of tensile properties and the like. As described in JP-A H03-160053, the oxygen-curable substance is preferably used in combination with a photo-curable substance.

Also when the composition of the present invention contains particles of a cured sealant, the resulting cured product can be provided with a surface sufficiently irregular such that improved design quality can be achieved. As described in JP-A 2001-115142, the preferred diameter, amount, materials and other conditions of the particles of a cured sealant are as follows. The diameter is preferably 0.1 to 1 mm and more preferably about 0.2 to 0.5 mm. The amount is preferably 5 to 100% by weight and more preferably 20 to 50% by weight of the curable sealant composition. Examples of the materials include urethane resin, silicone, modified silicone, and polysulfide rubber, although the materials are not limited as long as they are usable for sealants. Modified silicone sealants are preferred.

The curable sealant composition of the present invention may optionally contain a thixotropic agent (anti-sagging agent) to prevent sagging and improve workability. Examples of the anti-sagging agents include, but not limited to, polyamide waxes, hydrogenated castor oil derivatives, and metal soaps such as calcium stearate, aluminum stearate, and barium stearate. The use of powdery rubber having a particle size of 10 to 500 μm as disclosed in JP-A H11-349916 or organic fibers as disclosed in JP-A 2003-155389 enables the preparation of a composition that is highly thixotropic and has good workability. These thixotropic agents (anti-sagging agents) may be used alone, or two or more of these may be used in combination. The thixotropic agent is used in an amount of 0.1 to 20 parts by weight for each 100 parts by weight of the component (A).

The composition of the present invention may contain a compound containing an epoxy group in each molecule. Such an epoxy group-containing compound enhances the recovery of the cured product. Examples of the epoxy group-containing compounds include epoxidized unsaturated fats and oils, epoxidized unsaturated fatty acid esters, alicyclic epoxy compounds, and epichlorohydrin derivatives; and mixtures thereof. Specific examples thereof include epoxidized soybean oil, epoxidized linseed oil, bis(2-ethylhexyl)-4,5-epoxycyclohexane-1,2-dicarboxylate (E-PS), epoxy octyl stearate, and epoxy butyl stearate. Particularly preferred among these is E-PS. The epoxy compound is preferably used in an amount of 0.5 to 50 parts by weight for each 100 parts by weight of the component (A).

A filler may be added into the composition of the present invention. Examples of the fillers include reinforcing fillers such as fumed silica, precipitated silica, crystalline silica, fused silica, dolomite, silicic anhydride, hydrous silicic acid, and carbon black; fillers such as ground calcium carbonate, colloidal calcium carbonate, magnesium carbonate, diatomite, calcined clay, clay, talc, titanium oxide, bentonite, organobentonite, ferric oxide, fine aluminum powder, flint powder, zinc oxide, activated zinc white, shirasu balloons, glass microballoons, organic microballoons of a phenolic resin or a vinylidene chloride resin, and resin powders such as PVC powder and PMMA powder; and fibrous fillers such as glass fiber and filaments. When a filler is used, the amount thereof for each 100 parts by weight of the component (A) is 1 to 250 parts by weight, preferably 10 to 200 parts by weight.

In the case that such a filler is used in order to obtain a high strength cured product, the filler is preferably selected mainly from, for example, fumed silica, precipitated silica, crystalline silica, fused silica, dolomite, silicic anhydride, hydrous silicic acid, carbon black, surface-treated finely divided calcium carbonate, calcined clay, clay, and activated zinc white. When such a filler is used in an amount of 1 to 200 parts by weight for each 100 parts by weight of the component (A), preferred results can be achieved. In the case that the filler is used in order to obtain a cured product having low strength and great elongation at break, preferred results can be achieved when the filler is selected mainly from, for example, titanium oxide, calcium carbonates such as ground calcium carbonate, magnesium carbonate, talc, ferric oxide, zinc oxide, and shirasu balloons, and is used in an amount of 5 to 200 parts by weight for each 100 parts by weight of the component (A). In general, calcium carbonate with a greater specific surface area is more effective in improving the tensile strength at break, elongation at break, and adhesion of the cured product. Of course, these fillers may be used alone or two or more may be used in admixture. When calcium carbonate is used, it is desirable to combine surface-treated finely divided calcium carbonate with a calcium carbonate having a large particle size such as ground calcium carbonate. The surface-treated finely divided calcium carbonate preferably has a particle size of 0.5 µm or smaller, and is preferably surface-treated with a fatty acid or a fatty acid salt. The large particle size calcium carbonate preferably has a particle size of at least 1 µm, and may not be surface-treated.

In the present invention, a balloon (preferably with an average particle size of 0.1 mm or larger) may be used. The use of a balloon results in the formation of a sanded or sandstone-like coarse surface, and also reduces the weight. As described in JP-A H10-251618, the preferred diameter, amount, materials and other conditions of the balloon are as follows.

Balloons are spherical fillers having a hollow inside. Examples of the materials of the balloons include, but not limited to, inorganic materials such as glass, shirasu, and silica, and organic materials such as phenol resin, urea resin, polystyrene, and Saran. An inorganic material and an organic material may be formed into a composite or may be layered to form a multilayer. Inorganic, organic, or their composite balloons, for example, may be used. Also, a single type of balloon may be used, or a mixture of multiple types of balloons differing in materials may be used. Moreover, the surface of the balloon used may be processed or coated, or may be treated with various surface treating agents. For example, organic balloons may be coated with an agent such as calcium carbonate, talc, or titanium oxide, or inorganic balloons may be surface-treated with adhesion promoters.

To obtain a sanded or sandstone-like coarse surface, the particle size of the balloon is preferably 0.1 mm or larger. Balloons having a particle size of about 0.2 to 5.0 mm or about 0.5 to 5.0 mm are also usable. A balloon with a particle size smaller than 0.1 mm may not provide a coarse texture but only increase the viscosity of the composition even when it is added in a large amount. The amount of the balloon can be easily determined according to the coarseness of the desired sanded or sandstone-like texture. Generally, it is desirable to add a balloon having a particle size of 0.1 mm or larger at a ratio that gives a volume concentration of 5 to 25 vol % of the composition. The use of the balloon at a volume concentration lower than 5 vol % tends to provide no coarse texture. A concentration higher than 25 vol % tends to increase the viscosity of the sealant or adhesive and thus deteriorate workability, and also to increase the modulus of the cured product, whereby the basic properties of the sealant or adhesive tend to be impaired. The volume concentration is particularly preferably 8 to 22 vol % in terms of the balance with the basic properties of the sealant.

When a balloon is used, the following agents may be added: an anti-slip agent as described in JP-A 2000-154368, and an amine compound for giving a matte appearance as well as irregularities to the surface of the cured product, particularly a primary and/or secondary amine with a melting point of 35° C. or higher, as described in JP-A 2001-164237.

Specific examples of the balloon include those described in JP-A H02-129262, JP-A H04-8788, JP-A H04-173867, JP-A H05-1225, JP-A H07-113073, JP-A H09-53063, JP-A H10-251618, JP-A 2000-154368, JP-A 2001-164237, and WO 97/05201.

Since the composition of the present invention gives a cured product with, for example, good chemical resistance, the composition can be suitably applied to adhesives for the joints of exterior walls of houses, such as siding boards, particularly ceramic siding boards, adhesives for exterior wall tiles, and adhesives for exterior wall tiles, which are intended to be left alone in the joints. Here, it is desirable to match the design of a sealant with the exterior wall design. In particular, exterior walls with luxurious feeling created, for example, by sputter coating or by the addition of colored aggregates are being used. When a scaly or particulate substance having a diameter of 0.1 mm or greater, preferably about 0.1 to 5.0 mm, is added into the composition of the present invention, the resulting composition has the advantages that the cured product can match up with such luxurious exterior walls and that the cured product shows excellent chemical resistance and thus can maintain the appearance for a long time. When a particulate substance is used, a sanded or sandstone-like coarse surface can be formed. When a scaly substance is used, an irregular surface resulting from its scaly shape can be formed.

As described in JP-A H09-53063, the preferred diameter, amount, materials and other conditions of the scaly or particulate substance are as follows.

The diameter is 0.1 mm or larger, preferably about 0.1 to 5.0 mm, and may be appropriately selected according to the material, pattern, and other conditions of the exterior wall. Those with a diameter of about 0.2 to 5.0 mm or about 0.5 to 5.0 mm are also usable. In the case of using a scaly substance, the thickness of the substance should be about 1/10 to 1/5 of the diameter (i.e. about 0.01 to 1.00 mm). The scaly or particulate substance is previously mixed with a sealant base mixture to prepare a sealant before transportation to the work site, or is mixed with a sealant base mixture at the work site before use.

The scaly or particulate substance is added in an amount of about 1 to 200 parts by weight for each 100 parts by weight of the composition such as a sealant composition or an adhesive composition. The amount to be added is appropriately selected according to the particular size of the scaly or particulate substance, the material and pattern of the exterior wall, and other factors. Examples of the scaly or particulate substances include natural substances such as silica sand and mica, synthetic rubber, synthetic resin, and inorganic materials such as alumina. To improve the design quality of the joint filled with the composition, the scaly or particulate substance is colored a suitable color according to the material, pattern and other conditions of the exterior wall.

The curable sealant composition of the present invention may contain a flame retardant such as phosphorus plasticizers such as ammonium polyphosphate and tricresyl phosphate, aluminum hydroxide, magnesium hydroxide, and thermoexpandable graphite. These flame retardants may be used alone, or two or more of these may be used in combination.

The flame retardant is used in an amount of 5 to 200 parts by weight, preferably 10 to 100 parts by weight, for each 100 parts by weight of the component (A).

The curable sealant composition of the present invention may optionally contain a tackifier. The tackifier resin is not particularly limited as long as it is a conventional one which may be either in the solid or liquid state at room temperature. Examples of the tackifier resins include styrene block copolymers and hydrogenated products thereof, phenol resins, modified phenol resins (e.g. cashew oil-modified phenol resins, tall oil-modified phenol resins), terpene phenol resins, xylene-phenol resins, cyclopentadiene-phenol resins, cumarone indene resins, rosin resins, rosin ester resins, hydrogenated rosin ester resins, xylene resins, low molecular weight polystyrene resins, styrene copolymer resins, petroleum resins (e.g. C5 hydrocarbon resin, C9 hydrocarbon resin, C5/C9 hydrocarbon copolymer resin), hydrogenated petroleum resins, terpene resins, and DCPD petroleum resins. These may be used alone, or two or more of these may be used in combination.

Examples of the styrene block copolymers and hydrogenated products thereof include, but not limited to, styrene-butadiene-styrene block copolymers (SBS), styrene-isoprene-styrene block copolymers (SIS), styrene-ethylene-butylene-styrene block copolymers (SEBS), styrene-ethylene-propylene-styrene block copolymers (SEPS), and styrene-isobutylene-styrene block copolymers (SIBS).

When a tackifier is added, the amount thereof for each 100 parts by weight of the organic polymer (A) is preferably 5 to 1,000 parts by weight, and more preferably 10 to 100 parts by weight.

The composition of the present invention may contain a solvent in order to reduce the viscosity of the composition, increase thixotropy and improve workability. The solvent is not particularly limited, and various compounds may be used. Specific examples thereof include hydrocarbon solvents such as toluene, xylene, heptane, hexane, and petroleum solvents; halogenated solvents such as trichloroethylene; ester solvents such as ethyl acetate and butyl acetate; ketone solvents such as acetone, methyl ethyl ketone, and methyl isobutyl ketone; alcohol solvents such as methanol, ethanol, and isopropyl alcohol; and silicone solvents such as hexamethylcyclotrisiloxane, octamethylcyclotetrasiloxane, and decamethylcyclopentasiloxane. These solvents may be used alone, or two or more of these may be used in combination.

If the amount of the solvent added is large, however, the toxicity to the human body may then be high, and the volume of the cured product may shrink, for instance. Therefore, the amount of the solvent to be used for each 100 parts by weight of the component (A) is preferably 3 parts by weight or less, more preferably 1 part by weight or less, and most preferably substantially zero.

The curable sealant composition of the present invention may optionally contain various additives in order to adjust physical properties of the curable sealant composition or a cured product thereof. Examples of the additives include curability modifiers, radical inhibitors, metal deactivators, antiozonants, phosphorus-containing peroxide decomposers, lubricants, pigments, blowing agents, repellents for ants, and antifungal agents. These additives may be used alone, or two or more of these may be used in combination. Specific examples of the additives other than the ones specifically mentioned herein are described in, for example, JP-B H04-69659, JP-B H07-108928, JP-A S63-254149, JP-A S64-22904, and JP-A 2001-72854.

The curable sealant composition of the present invention can be prepared in a one-component form which contains all the premixed formulation components in a hermetically closed vessel, and is curable at room temperature by moisture in the air after application.

In the case where the curable sealant composition is prepared in a one-component form, since all the formulation components are previously mixed, it is preferred that the water-containing formulation components be dehydrated and dried prior to use, or be dehydrated by, for example, the application of reduced pressure during mixing and kneading. In the case where the curable sealant composition is prepared in a two-component form, since the curing catalyst needs not be mixed in the base mixture containing the reactive silyl group-containing organic polymer, gelation is less likely to occur even when a small amount of water remains in the mixture. However, dehydration and drying are preferably performed when long-term storage stability is required. Suitable methods for dehydration and drying are thermal drying or dehydration under reduced pressure in the case of solids such as powder, and dehydration under reduced pressure or dehydration using, for example, synthetic zeolite, active alumina, silica gel, quick lime, or magnesium oxide in the case of liquids. In addition to these methods for dehydration and drying, dehydration may also be carried out by adding an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, and γ-glycidoxypropyltrimethoxysilane, to react with water. Alternatively, dehydration may be performed by adding an oxazolidine compound such as 3-ethyl-2-methyl-2-(3-methylbutyl)-1,3-oxazolidine to react with water. Yet alternatively, dehydration may be performed by adding a small amount of an isocyanate compound to react water with the isocyanato group. The storage stability can be improved by adding an alkoxysilane compound, oxazolidine compound, or isocyanate compound.

The curable sealant composition of the present invention may be prepared by any methods including commonly used methods such as in which the above components are mixed and kneaded at room temperature or under heat with, for example, a mixer, roller, or a kneader; or in which the components are dissolved in a small amount of an appropriate solvent and then mixed.

When exposed to the air, the curable sealant composition of the present invention forms a three-dimensional network structure by the action of moisture, whereby it is cured into a rubbery, elastic solid.

The curable sealant composition of the present invention is usable for, for example, pressure-sensitive adhesives; sealants for buildings, ships, automobiles, roads, or other applications; adhesives; impression materials; vibration-proof materials; damping materials; soundproof materials; expanded/foamed materials; coating compositions; and spray coatings. The curable sealant composition of the present invention is especially suitable for sealants for buildings, particularly for working joints, because the composition gives a cured product having a low modulus, high elongation, and high recovery. The standard for sealants for buildings globally used is ISO 8339. The curable sealant composition of the present invention has a 100% modulus measured by a method in accordance with ISO 8339 of 0.4 MPa or lower. The composition also exhibits a recovery of 70% or higher as determined according to the curing method A in the recovery evaluation defined in ISO 8339. The composition also gives a cured product having an elongation at break of 400% or higher.

The curable sealant composition of the present invention gives off a small amount of methanol and thus is suitable for indoor use as well.

The one-component curable sealant composition of the present invention is also suitable for sealants for curtain walls, sealants for balcony window frames, sealants for stone materials, and sealants for bridges, as well as sealants for joints of exterior materials, such as siding boards, widely used in building applications.

The curable sealant composition of the present invention can also be used in the following applications other than sealants. For example, the composition is usable for various applications including electric and electronic part materials (e.g. solar cell backside sealants); electrical insulating materials (e.g. insulating coating materials for electric wires and cables); elastic adhesives; contact adhesives; spray sealants; crack repair materials; tile adhesives; powder coating compositions; casting materials; rubber materials for medical use; pressure-sensitive adhesives for medical use; sealants for medical devices; food packaging materials; coating materials; primers; electromagnetic-wave-shielding conductive materials; thermally conductive materials; hot melt materials; potting agents for electrics and electronics; films; gaskets; various molding materials; rustproof and waterproof encapsulants for wired glass and laminated glass edges (cut end faces); and liquid sealants for use in automotive parts, electrical machinery parts, various machinery parts and the like.

Furthermore, the curable composition can also be used as various hermetically sealing compositions and adhesive compositions because it, either alone or with the aid of a primer, can adhere tightly to a wide range of substrates such as glass, ceramics, wood, metals, and resin moldings.

In addition, the curable composition of the present invention can also be used for adhesives for interior panels, adhesives for exterior panels, tile adhesives, stone pitching adhesives, ceiling finishing adhesives, floor finishing adhesives, wall finishing adhesives, vehicle panel adhesives, and adhesives for electric/electronic/precision device assembling.

EXAMPLES

Hereinafter, the present invention will be described in more detail with reference to examples, reference examples, and comparative examples, which, however, are not intended to limit the scope of the present invention.

Synthesis Example 1

Propylene oxide was polymerized in the presence of polypropylene glycol as an initiator and a zinc hexacyano-cobaltate glyme complex catalyst to give a hydroxy group-terminated polypropylene oxide. The number average molecular weight calculated based on the number of hydroxy groups of the hydroxy group-terminated polypropylene oxide was 20,000. Next, 1.2 equivalents of NaOMe in methanol per hydroxy group of the hydroxy group-terminated polypropylene oxide was added, the methanol was distilled off, and 1.3 equivalents of allyl chloride was then added to convert the terminal hydroxy group to an allyl group. The unreacted allyl chloride was removed under reduced pressure.

The resulting unpurified allyl-terminated polypropylene oxide (100 parts by weight) was mixed with n-hexane (300 parts by weight) and water (300 parts by weight) with stirring, and then the water was removed by centrifugation. The resulting hexane solution was further mixed with water (300 parts by weight) with stirring, and the water was removed again by centrifugation. Thereafter, the hexane was removed under reduced pressure. Thus, an allyl group-terminated polypropylene oxide (a-1) was prepared.

The allyl group-terminated polypropylene oxide (a-1) (100 parts by weight) was reacted with triethoxysilane (1.2 parts by weight) at 90° C. for two hours in the presence of an isopropanol solution of a platinum-vinylsiloxane complex (150 ppm, platinum content: 3% by weight) as a catalyst, to give a triethoxysilyl group-terminated polypropylene oxide (polymer (A-1)). As a result of $^1$H-NMR measurement (measured in a $CDCl_3$ solvent with JNM-LA400 produced by JEOL Ltd.), the average number of terminal triethoxysilyl groups of the polymer (A-1) per molecule was found to be 1.3.

Synthesis Example 2

Propylene oxide was polymerized in the presence of polypropylene glycol as an initiator and a zinc hexacyano-cobaltate glyme complex catalyst to give a hydroxy group-terminated polypropylene oxide. The number average molecular weight calculated based on the number of hydroxy groups of the hydroxy group-terminated polypropylene oxide was 17,000. Next, 1.2 equivalents of NaOMe in methanol per hydroxy group of the hydroxy group-terminated polypropylene oxide was added, the methanol was distilled off, and then 1.3 equivalents of allyl chloride was added to convert the terminal hydroxy group to an allyl group. The unreacted allyl chloride was removed under reduced pressure.

The resulting unpurified allyl-terminated polypropylene oxide (100 parts by weight) was mixed with n-hexane (300 parts by weight) and water (300 parts by weight) with stirring, and then the water was removed by centrifugation. The resulting hexane solution was further mixed with water (300 parts by weight) with stirring, and the water was removed again by centrifugation. Thereafter, the hexane was removed under reduced pressure. Thus, an allyl group-terminated polypropylene oxide (a-2) was prepared.

The allyl group-terminated polypropylene oxide (a-2) (100 parts by weight) was reacted with triethoxysilane (1.3 parts by weight) at 90° C. for two hours in the presence of an isopropanol solution of a platinum-vinylsiloxane complex (150 ppm, platinum content: 3% by weight) as a catalyst, to give a triethoxysilyl group-terminated polypropylene oxide (polymer (A-2)). As a result of $^1$H-NMR measurement (measured in a $CDCl_3$ solvent with JNM-LA400 produced by JEOL Ltd.), the average number of terminal triethoxysilyl groups of the polymer (A-2) per molecule was found to be 1.4.

Synthesis Example 3

Propylene oxide was polymerized in the presence of polypropylene glycol as an initiator and a zinc hexacyanocobaltate glyme complex catalyst to give a hydroxy group-terminated polypropylene oxide. The number average molecular weight calculated based on the number of hydroxy groups of the hydroxy group-terminated polypropylene oxide was 14,000. Next, 1.2 equivalents of NaOMe in methanol per hydroxy group of the hydroxy group-terminated polypropylene oxide was added, the methanol was distilled off, and then 1.3 equivalents of allyl chloride was added to convert the terminal hydroxy group to an allyl group. The unreacted allyl chloride was removed under reduced pressure.

The resulting unpurified allyl-terminated polypropylene oxide (100 parts by weight) was mixed with n-hexane (300 parts by weight) and water (300 parts by weight) with stirring, and then the water was removed by centrifugation. The resulting hexane solution was further mixed with water (300 parts by weight) with stirring, and the water was removed again by centrifugation. Thereafter, the hexane was removed under reduced pressure. Thus, an allyl group-terminated polypropylene oxide (a-3) was prepared.

The allyl group-terminated polypropylene oxide (a-3) (100 parts by weight) was reacted with triethoxysilane (1.7 parts by weight) at 90° C. for two hours in the presence of an isopropanol solution of a platinum-vinylsiloxane complex (150 ppm, platinum content: 3% by weight) as a catalyst, to give a triethoxysilyl group-terminated polypropylene oxide (polymer (A-3)). As a result of $^1$H-NMR measurement (measured in a $CDCl_3$ solvent with JNM-LA400 produced by JEOL Ltd.), the average number of terminal triethoxysilyl groups of the polymer (A-3) per molecule was found to be 1.5.

Synthesis Example 4

Propylene oxide was polymerized in the presence of polypropylene glycol as an initiator and a zinc hexacyanocobaltate glyme complex catalyst to give a hydroxy group-terminated polypropylene oxide. The number average molecular weight calculated based on the number of hydroxy groups of the hydroxy group-terminated polypropylene oxide was 10,000. Next, 1.2 equivalents of NaOMe in methanol per hydroxy group of the hydroxy group-terminated polypropylene oxide was added, the methanol was distilled off, and then 1.3 equivalents of allyl chloride was added to convert the terminal hydroxy group to an allyl group. The unreacted allyl chloride was removed under reduced pressure.

The resulting unpurified allyl-terminated polypropylene oxide (100 parts by weight) was mixed with n-hexane (300 parts by weight) and water (300 parts by weight) with stirring, and then the water was removed by centrifugation. The resulting hexane solution was further mixed with water (300 parts by weight) with stirring, and the water was removed again by centrifugation. Thereafter, the hexane was removed under reduced pressure. Thus, an allyl group-terminated polypropylene oxide (a-4) was prepared.

The allyl group-terminated polypropylene oxide (a-4) (100 parts by weight) was reacted with triethoxysilane (4.2 parts by weight) at 90° C. for two hours in the presence of an isopropanol solution of a platinum-vinylsiloxane complex (150 ppm, platinum content: 3% by weight) as a catalyst, to give a triethoxysilyl group-terminated polypropylene oxide (polymer (A-4)). As a result of $^1$H-NMR measurement (measured in a $CDCl_3$ solvent with JNM-LA400 produced by JEOL Ltd.), the average number of terminal triethoxysilyl groups of the polymer (A-4) per molecule was found to be 1.5.

Synthesis Example 5

Propylene oxide was polymerized in the presence of polypropylene triol as an initiator and a zinc hexacyanocobaltate glyme complex catalyst to give a hydroxy group-terminated polypropylene oxide. The number average molecular weight calculated based on the number of hydroxy groups of the hydroxy group-terminated polypropylene oxide was 19,000. Next, 1.2 equivalents of NaOMe in methanol per hydroxy group of the hydroxy group-terminated polypropylene oxide was added, the methanol was distilled off, and then 1.3 equivalents of allyl chloride was added to convert the terminal hydroxy group to an allyl group. The unreacted allyl chloride was removed under reduced pressure.

The resulting unpurified allyl-terminated polypropylene oxide (100 parts by weight) was mixed with n-hexane (300 parts by weight) and water (300 parts by weight) with stirring, and then the water was removed by centrifugation. The resulting hexane solution was further mixed with water (300 parts by weight) with stirring, and the water was removed again by centrifugation. Thereafter, the hexane was removed under reduced pressure. Thus, an allyl group-terminated polypropylene oxide (a-5) was prepared.

The allyl group-terminated polypropylene oxide (a-5) (100 parts by weight) was reacted with triethoxysilane (2.5 parts by weight) at 90° C. for two hours in the presence of an isopropanol solution of a platinum-vinylsiloxane complex (150 ppm, platinum content: 3% by weight) as a catalyst, to give a triethoxysilyl group-terminated polypropylene oxide (polymer (A-5)). As a result of $^1$H-NMR measurement (measured in a $CDCl_3$ solvent with JNM-LA400 produced by JEOL Ltd.), the average number of terminal triethoxysilyl groups of the polymer (A-5) per molecule was found to be 1.8.

Synthesis Example 6

Propylene oxide was polymerized in the presence of polypropylene glycol as an initiator and a zinc hexacyanocobaltate glyme complex catalyst to give a hydroxy group-terminated polypropylene oxide. The number average molecular weight calculated based on the number of hydroxy groups of the hydroxy group-terminated polypropylene oxide was 11,000. Next, 1.2 equivalents of NaOMe in methanol per hydroxy group of the hydroxy group-terminated polypropylene oxide was added, the methanol was distilled off, and then 1.3 equivalents of allyl chloride was added to convert the terminal hydroxy group to an allyl group. The unreacted allyl chloride was removed under reduced pressure.

The resulting unpurified allyl-terminated polypropylene oxide (100 parts by weight) was mixed with n-hexane (300 parts by weight) and water (300 parts by weight) with stirring, and then the water was removed by centrifugation. The resulting hexane solution was further mixed with water (300 parts by weight) with stirring, and the water was removed again by centrifugation. Thereafter, the hexane was removed under reduced pressure. Thus, an allyl group-terminated polypropylene oxide (b-1) was prepared.

The allyl group-terminated polypropylene oxide (b-1) (100 parts by weight) was reacted with dimethoxymethylsilane (1.3 parts by weight) at 90° C. for two hours in the presence of an isopropanol solution of a platinum-vinylsiloxane complex (150 ppm, platinum content: 3% by weight) as a catalyst, to give a dimethoxymethylsilyl group-terminated polypropylene oxide (polymer (B-1)). As a result of $^1$H-NMR measurement (measured in a CDCl$_3$ solvent with JNM-LA400 produced by JEOL Ltd.), the average number of terminal dimethoxymethylsilyl groups of the polymer (B-1) per molecule was found to be 1.2.

Synthesis Example 7

The allyl group-terminated polypropylene oxide (a-2) prepared in Synthesis Example 2 (100 parts by weight) was reacted with dimethoxymethylsilane (0.9 parts by weight) at 90° C. for two hours in the presence of an isopropanol solution of a platinum-vinylsiloxane complex (150 ppm, platinum content: 3% by weight) as a catalyst, to give a dimethoxymethylsilyl group-terminated polypropylene oxide (polymer (B-2)). As a result of $^1$H-NMR measurement (measured in a CDCl$_3$ solvent with JNM-LA400 produced by JEOL Ltd.), the average number of terminal dimethoxymethylsilyl groups of the polymer (B-2) per molecule was found to be 1.4.

Synthesis Example 8

The triethoxysilyl group-terminated polypropylene oxide (A-1) prepared in Synthesis Example 1 (100 parts by weight) was mixed with methanol (20 parts by weight) with stirring at 70° C. for two hours in the presence of a methanol solution of 0.5% by weight hydrochloric acid (0.24% by weight) as a catalyst, to convert the terminal triethoxysilyl group to a trimethoxysilyl group. Finally, the methanol was removed under reduced pressure. Thus, a trimethoxysilyl group-terminated polypropylene oxide (polymer (B-3)) was prepared. As a result of $^1$H-NMR measurement (measured in a CDCl$_3$ solvent with JNM-LA400 produced by JEOL Ltd.), the average number of terminal trimethoxysilyl groups of the polymer (B-3) per molecule was found to be 1.3.

Example 1

The triethoxysilyl group-terminated polypropylene oxide (A-1) (100 parts by weight) obtained in Synthesis Example 1, surface-treated colloidal calcium carbonate (Shiraishi Kogyo Kaisha Ltd., trade name: Hakuenka CCR, 160 parts by weight), ground calcium carbonate (Shiraishi Calcium Kaisha, Ltd., trade name: WHITON SB, 64 parts by weight), a diisononyl phthalate plasticizer (J-PLUS Co., Ltd., trade name: DINP, 90 parts by weight), titanium oxide (Ishihara Sangyo Kaisha Ltd., trade name: Tipaque R-820, 10 parts by weight), a thixotropic agent (Kusumoto Chemicals Ltd., trade name: Disparlon 6500, 2 parts by weight), an ultraviolet absorber (Ciba Japan K.K., trade name: Tinuvin 326, 1 part by weight), and a light stabilizer (Sankyo Lifetech Co., Ltd., trade name: Sanol LS770, 1 part by weight) were weighed out and mixed roughly by a spatula. The mixture was passed through a three-roll paint mill three times for well dispersion. The mixture was dehydrated under reduced pressure for 2 hours at 120° C., and then cooled to 50° C. or lower. Into the mixture, vinyltriethoxysilane as a dehydrating agent (Momentive Performance Materials Inc., trade name: A-151, 3.9 parts by weight), and γ-aminopropyltriethoxysilane as an adhesion promoter (Momentive Performance Materials Inc., trade name: A-1100, 3.7 parts by weight) were mixed. To the mixture was then added dibutyltin acetylacetonate as a curing catalyst (Nitto Kasei Co., Ltd., trade name: NEOSTANN U-220H, 1 part by weight), and they were kneaded in an atmosphere substantially free from moisture. The resulting composition was hermetically packed in a cartridge, a moisture-proof container. Thus, a one-component curable sealant composition was prepared.

Examples 2 to 7 and Comparative Examples 1 to 5

A one-component curable sealant composition was prepared in the same manner as in Example 1 from compounding ingredients in amounts shown in Table 1. The compounding ingredients used are listed below.

Oleyl monoglyceride (Kao Corporation, trade name: Excel O-95R) as a compound having a diol structure
Trimethoxysilyl group-containing vinyl silane (Momentive Performance Materials Inc., trade name: A-171)
Trimethoxysilyl group-containing aminosilane: γ-aminopropyltrimethoxysilane (Momentive Performance Materials Inc., trade name: A-1110)

Example 8

A one-component curable sealant composition was prepared in the same manner as in Examples 1 to 7, except that a linear polymer and a branched polymer were mixed at a ratio of (2 parts by weight):(8 parts by weight). The results are shown in Table 1. Table 1 shows that the cured product of Example 8, even though containing a large amount of a branched polymer, exhibited excellent performance in terms of elongation at break, which is one of the dumbbell tensile properties, as compared to that of the polymer of Comparative Example 2.

TABLE 1

| | | Examples | | | | | | | |
|---|---|---|---|---|---|---|---|---|---|
| | | 1 | 2 | 3 | 4 | 5 | 6 | 7 | 8 |
| Ethanol-elimination reactive silyl group-containing organic polymer | A-1 | 100 | 100 | 100 | 100 | 100 | | | 20 |
| | A-2 | | | | | | 100 | | |
| | A-3 | | | | | | | 100 | |
| | A-4 | | | | | | | | |
| | A-5 | | | | | | | | 80 |
| Methanol-elimination reactive silyl group-containing organic polymer | B-1 | | | | | | | | |
| | B-2 | | | | | | | | |
| | B-3 | | | | | | | | |
| Colloidal calcium carbonate | HAKUENKA CCR | 160 | 160 | 160 | 160 | 160 | 160 | 160 | 160 |
| Ground calcium carbonate | WHITON SB | 64 | 64 | 64 | 64 | 64 | 64 | 64 | 64 |

TABLE 1-continued

| | | | | | | | | | |
|---|---|---|---|---|---|---|---|---|---|
| Plasticizer | DINP | 90 | 90 | 90 | 90 | 90 | 90 | 90 | 90 |
| Titanium oxide | Tipaque R-820 | 10 | 10 | 10 | 10 | 10 | 10 | 10 | 10 |
| Thixotropic agent | Disparlon 6500 | 2 | 2 | 2 | 2 | 2 | 2 | 2 | 2 |
| Ultraviolet absorber | Tinuvin 326 | 1 | 1 | 1 | 1 | 1 | 1 | 1 | 1 |
| Light stabilizer | Sanol LS770 | 1 | 1 | 1 | 1 | 1 | 1 | 1 | 1 |
| Compound having diol structure | Excel O-95R | | 3 | | | | | | |
| Triethoxysilyl group-containing vinylsilane | A-151 | 3.9 | 3.9 | | 3.9 | | | | |
| Trimethoxysilyl group-containing vinylsilane | A-171 | | | 3 | | 3 | 3 | 3 | 3 |
| Triethoxysilyl group-containing aminosilane | A-1100 | 3.7 | 3.7 | 3.7 | | | | | |
| Trimethoxysilyl group-containing aminosilane | A-1110 | | | | 3 | 3 | 3 | 3 | 3 |
| Curing catalyst | NEOSTANN U-220H | 1 | 1 | 1 | 1 | 1 | 1 | 1 | 1 |
| H-tensile property of cured product (measured at 23° C. by method in ISO 8339) | 60% modulus (MPa) | 0.21 | 0.16 | 0.20 | 0.21 | 0.22 | 0.28 | 0.45 | 0.54 |
| | 100% modulus (MPa) | 0.31 | 0.24 | 0.29 | 0.31 | 0.33 | 0.39 | 0.59 | 0.72 |
| Recovery (%) of cured product (measured by method in ISO 7389) | | 72 | 75 | 73 | 71 | 80 | 86 | 87 | 92 |
| Dumbbell tensile properties of cured product | 100% modulus (MPa) | 0.30 | 0.21 | 0.33 | 0.36 | 0.33 | 0.40 | 0.65 | 0.75 |
| | Strength at break (MPa) | 1.08 | 0.94 | 1.04 | 1.28 | 1.26 | 1.26 | 1.51 | 1.60 |
| | Elongation at break (%) | 655 | 795 | 650 | 745 | 670 | 580 | 450 | 460 |
| Dynamic outdoor exposure test | | No change | No change | No change | No change | No change | No change | No change | No change |
| Surface curability | Initial skin formation time (min) | 190 | 200 | 150 | 340 | 195 | 200 | 190 | 120 |
| | Skin formation time after storage (min) | 365 | 195 | 205 | 300 | 100 | 120 | 105 | 100 |
| Change from initial skin formation time to skin formation time after storage | | 1.9 | 1.0 | 1.4 | 0.9 | 0.5 | 0.6 | 0.6 | 0.8 |
| 2-rpm viscosity of curable composition at 23° C. | Initial viscosity (Pa · s) | 1420 | 1225 | 1350 | 1230 | 1320 | 1350 | 1210 | 1300 |
| | Viscosity after storage (Pa · s) | 1660 | 1475 | 1615 | 1400 | 1645 | 1720 | 1380 | 1520 |
| Increase in viscosity after storage | | 1.2 | 1.2 | 1.2 | 1.1 | 1.2 | 1.3 | 1.1 | 1.2 |

| | | Comparative Examples | | | | |
|---|---|---|---|---|---|---|
| | | 1 | 2 | 3 | 4 | 5 |
| Ethanol-elimination reactive silyl group-containing organic polymer | A-1 | | | | | |
| | A-2 | | | | | |
| | A-3 | | | | | |
| | A-4 | 100 | | | | |
| | A-5 | | 100 | | | |
| Methanol-elimination reactive silyl group-containing organic polymer | B-1 | | | 100 | | |
| | B-2 | | | | 100 | |
| | B-3 | | | | | 100 |
| Colloidal calcium carbonate | HAKUENKA CCR | 160 | 160 | 160 | 160 | 160 |
| Ground calcium carbonate | WHITON SB | 64 | 64 | 64 | 64 | 64 |
| Plasticizer | DINP | 90 | 90 | 90 | 90 | 90 |
| Titanium oxide | Tipaque R-820 | 10 | 10 | 10 | 10 | 10 |
| Thixotropic agent | Disparlon 6500 | 2 | 2 | 2 | 2 | 2 |
| Ultraviolet absorber | Tinuvin 326 | 1 | 1 | 1 | 1 | 1 |
| Light stabilizer | Sanol LS770 | 1 | 1 | 1 | 1 | 1 |
| Compound having diol structure | Excel O-95R | | | | | |
| Triethoxysilyl group-containing vinylsilane | A-151 | | | | | |
| Trimethoxysilyl group-containing vinylsilane | A-171 | 3 | 3 | 3 | 3 | 3 |
| Triethoxysilyl group-containing aminosilane | A-1100 | | | | | |
| Trimethoxysilyl group-containing aminosilane | A-1110 | 3 | 3 | 3 | 3 | 3 |
| Curing catalyst | NEOSTANN U-220H | 1 | 1 | 1 | 1 | 0.15 |
| H-tensile property of cured product (measured at 23° C. by method in ISO 8339) | 60% modulus (MPa) | 0.57 | 0.73 | 0.21 | 0.27 | 0.29 |
| | 100% modulus (MPa) | 0.85 | 0.92 | 0.31 | 0.37 | 0.41 |
| Recovery (%) of cured product (measured by method in ISO 7389) | | 93 | 99 | 34 | 49 | 85 |
| Dumbbell tensile properties of cured product | 100% modulus (MPa) | 0.88 | 0.91 | 0.36 | 0.39 | 0.44 |
| | Strength at break (MPa) | 1.48 | 1.75 | 0.89 | 1.37 | 1.78 |
| | Elongation at break (%) | 210 | 295 | 520 | 745 | 640 |
| Dynamic outdoor exposure test | | Interfacial failure | Interfacial failure | Wrinkles | Wrinkles | No change |
| Surface curability | Initial skin formation time (min) | 170 | 100 | 380 | 215 | 50 |
| | Skin formation time after storage (min) | 90 | 50 | 1100 | 290 | 70 |
| Change from initial skin formation time to skin formation time after storage | | 0.5 | 0.5 | 2.9 | 1.3 | 1.4 |
| 2-rpm viscosity of curable composition at 23° C. | Initial viscosity (Pa · s) | 1190 | 1280 | 1040 | 1410 | 1290 |
| | Viscosity after storage (Pa · s) | 1275 | 1540 | 1295 | 1530 | 2670 |
| Increase in viscosity after storage | | 1.1 | 1.2 | 1.2 | 1.1 | 2.1 |

As shown in Table 1, the compositions containing any of the triethoxysilyl-terminated polypropylene oxides (A-1) to (A-5) all exhibit recovery as high as 70% or higher. The compositions of Comparative Examples 3 and 4 each contain a methyldimethoxysilyl-terminated polypropylene oxide, and both compositions show recovery as low as below 50%. The composition of Comparative Example 5 contains a trimethoxysilyl-terminated polypropylene oxide, and it shows a high recovery of 85%. These results demonstrated that polypropylene oxides containing a trialkoxysilyl group are advantageous in terms of recovery. The results of the dynamic outdoor exposure test also revealed that the compositions with a polypropylene oxide containing a trialkoxysilyl group perform well without forming wrinkles. In contrast, the compositions of Comparative Examples 3 and 4 each containing a methyldimethoxysilyl group-terminated polypropylene oxide had deep wrinkles formed at the center portion of the joint in parallel with the joint.

For use as a sealant for buildings, the composition needs to have a tensile elongation of 400% or higher. The molecular weight of a triethoxysilyl-terminated polypropylene oxide is greatly correlated to the elongation at break of the resulting cured product. It is difficult for the polymer (A-4) having a molecular weight of 10000 to achieve an elongation of 400% or higher, whereas the use of the polymer (A-3) having a molecular weight of 14000 enables this goal. The composition of Comparative Example 2, which contains the polymer (A-5) having a branched backbone with a molecular weight of 19000, does not achieve a high elongation of 400% or higher either. This means that a linear backbone is preferred. Also, the compositions with low tensile elongation resulted in interfacial delamination from an aluminum substrate in the dynamic exposure test, which indicates that the elongation needs to be at least 400%.

Meanwhile, ratios of the initial viscosity of each curable sealant composition to the viscosity after storage thereof are shown at the bottom row of the table. The composition of Comparative Example 5 containing a trimethoxysilyl group-terminated polypropylene oxide had a large increase in viscosity and thus was unable to withstand long-term storage. In contrast, the compositions containing a triethoxysilyl group-terminated polypropylene oxide or a methyldimethoxysilyl group-terminated polypropylene oxide were found to have no viscosity increase after storage and thus be stable.

Moreover, the polymers (A-2, B-2) and the formulations in Example 6 and Comparative Example 4 are substantially the same; the reactive silyl group of the polymer in Example 6 is a triethoxysilyl group, while the reactive silyl group of the polymer in Comparative Example 4 is a conventionally generally used methyldimethoxysilyl group. Regarding the dumbbell tensile properties of the cured product, however, the 50% modulus in Example 6 is just the same as that in Comparative Example 4; no increase in modulus was observed as a result of changing from the methyldimethoxysilyl group to the triethoxysilyl group.

The polymers (A3, A4) and the formulations in the Example 8 and Comparative Example 4 in Patent Literature 3, on the other hand, are substantially the same; the reactive silyl group of the polymer in the Example 8 is a triethoxysilyl group, while the reactive silyl group of the polymer in the Comparative Example 4 is a conventionally generally used methyldimethoxysilyl group. Regarding the dumbbell tensile properties of the cured product, however, the 50% modulus in the Example 6 is different from that in the Comparative Example 4; the modulus was increased from 0.85 to 0.92 as a result of changing from the methyldimethoxysilyl group to the triethoxysilyl group. The recoveries in Comparative Example 4 of the present invention and in the Comparative Example 4 of Patent Literature 3 are 49% and 47%, respectively, which are substantially the same as each other.

Thus, the change from the methyldimethoxysilyl group to the triethoxysilyl group in Patent Literature 3 increases modulus, whereas the change from the methyldimethoxysilyl group to the triethoxysilyl group in the present invention does not increase modulus at all. This difference is probably attributed to the use of a high molecular weight polymer and a large amount of a plasticizer in the present invention. The molecular weights in the Example 8 and Comparative Example 4 in Patent Literature 3 are both 14500. These molecular weights, however, are polystyrene-equivalent molecular weights measured by GPC, and each of them is about 10000 as determined in terms of the molecular weight calculated based on the number of hydroxy groups of a material polymer in the present invention.

This demonstrates that the change from the methyldimethoxysilyl group to the triethoxysilyl group in the present invention improves recovery similarly to the results in Patent Literature 3, but this change does not increase modulus and allows the composition to be used for low-modulus sealants, unlike Patent Literature 3.

Therefore, a goal to attain a one-component curable sealant composition having the properties required of sealants for buildings, i.e. high elongation and high recovery of the cured product, no wrinkles on the surface of the cured product when applied to moving joints, and no increase in the viscosity of the composition, which allows a long-term use, this goal can be achieved by the use of a curable sealant composition that includes a linear organic polymer having a number average molecular weight of at least 11000 and containing an ethanol-elimination reactive silyl group, a tetravalent tin compound, and a plasticizer.

The physical properties of the curable sealant compositions obtained above were determined by the following methods.

(Initial Skin Formation Time)

Each curable sealant composition was charged into a mold having a thickness of about 3 mm, and the surface of the composition was flattened. The time point at which the surface was flattened was defined as the curing start time. The surface of the composition was touched by a microspatula from time to time, and the time period required for the composition to no longer stick to the microspatula (regarded as skin formation time) was determined. The skin formation time was measured at 23° C. and 50% RH.

(Storage Stability)

The cartridge containing the curable sealant composition was put into a 50° C. oven and stored for 28 days. The cartridge was then taken out of the oven and left at 23° C. and 50% RH for one day. The skin formation time and viscosity of the resulting curable sealant composition were measured.

(H-Tensile Property of Cured Product)

An H specimen was prepared using an aluminum substrate by the method defined in ISO 8339, and cured by the curing method A (at 23° C. and 50% RH for 28 days). The specimen was subjected to tensile tests (tensile rate: 5 mm/min) at 23° C. and 50% RH and stretched with an autograph, to measure the moduli at 60% elongation and at 100% elongation.

(Recovery of Cured Product)

An H specimen as used in the above H-tensile test was prepared, and the recovery thereof was measured by the method of ISO 7389.

(Dumbbell Tensile Properties of Cured Product)

Each curable sealant composition was poured into a polyethylene mold carefully so that no air bubbles were entrained. Then the composition was cured at 23° C. and 50% RH for three days and then at 50° C. for four days, so that a cured product sheet having a thickness of 3 mm was obtained. No. 3 dumbbell specimens were punched out from the cured sheet, and subjected to tensile tests at 23° C. and 50% RH (tensile rate: 200 mm/min) to measure the 100% modulus, strength at break, and elongation at break.
(Viscosity of Curable Sealant Composition at 23° C.)

Each curable sealant composition left at 23° C. overnight was then charged into a 100-cc cup carefully so that no air bubbles were entrained. The viscosity at 2 rpm was measured at 23° C. and 50% RH using a Tokimec model BS viscometer with a No. 7 rotor.
(Dynamic Outdoor Exposure Test)

A device recommended by Japan Sealant Industry Association was used. The initial joint width was fixed to 10 mm using two anodized aluminum substrates. Into the 10 mm (width)×8 mm (depth)×50 mm (length) space formed between the aluminum substrates, the curable sealant composition was charged carefully so that no air bubbles were entrained. After curing at 23° C. and 50% RH for three days and then at 50° C. for four days, the resulting specimen was put in a dynamic exposure device outdoors, and the appearance of the specimen was then observed over time. The dynamic exposure device varies in the length of a metal bar connected thereto depending on environmental conditions such as temperature and weather, such that the distances between the aluminum substrates arranged to simulate a joint varies depending on the difference in coefficient of thermal expansion. With an initial joint width of 10 mm, the annual displacement measured was 19.0%. When the appearance after six months from application was observed, compositions having the same appearance as the initial appearance were rated as "no change", compositions having wrinkles on the surface were rated as "wrinkles", and compositions peeled from the aluminum substrate were rated as "interfacial failure".

INDUSTRIAL APPLICABILITY

The curable sealant composition of the present invention is usable for, for example, pressure-sensitive adhesives; sealants for buildings, ships, automobiles, road, or other applications; adhesives; impression materials; vibration-proof materials; damping materials; soundproof materials; expanded/foamed materials; coating compositions; and spray coatings. The curable sealant composition of the present invention is especially suitable for sealants for buildings, particularly for working joints, because the composition gives a cured product having a low modulus, high elongation, and high recovery.

The one-component curable sealant composition of the present invention is also suitable for sealants for curtain walls, sealants for balcony window frames, sealants for stone materials, and sealants for bridges, as well as sealants for joints of exterior materials, such as siding boards, widely used in building applications.

The invention claimed is:

1. A one-component curable sealant composition, comprising:
   100 parts by weight of a linear organic polymer (A) having a number average molecular weight calculated from the amount of hydroxy groups of 11,000 to 30,000, and having a triethoxysilyl group at a molecular terminal;
   0.5 to 10 parts by weight of a tetravalent tin compound (B);
   70 to 200 parts by weight of a plasticizer (C); and
   a silane coupling agent
   comprising a mixture of triethoxyvinylsilane and trimethoxyaminosilane.

2. The one-component curable sealant composition according to claim 1, wherein the tetravalent tin compound (B) is at least one of a dibutyltin compound and a dioctyltin compound.

3. The one-component curable sealant composition according to claim 1, wherein the component (A) comprises at least one of a polyoxyalkylene polymer and a polyacrylate polymer as its backbone.

4. The one-component curable sealant composition according to claim 1, wherein the component (A) has a number average molecular weight calculated from the amount of hydroxy groups of 13,000 to 25,000.

5. The one-component curable sealant composition according to claim 1, wherein the organic polymer (A) is derived from a polyoxyalkylene polymer formed by ring-opening addition polymerization of an alkylene oxide in the presence of a double metal cyanide complex catalyst.

6. The one-component curable sealant composition according to claim 1, wherein the organic polymer (A) is a polyoxypropylene polymer.

7. The one-component curable sealant composition according to claim 1, wherein the organic polymer (A) has 1.0 to 2.0 ethanol-elimination reactive silyl groups per molecule on average.

8. The one-component curable sealant composition according to claim 1, which gives a cured product having a modulus at 100% elongation, measured by a method defined in ISO 8339, of 0.4 MPa or lower.

9. A one-component curable sealant for buildings, comprising the curable sealant composition according to claim 1.

10. A one-component curable sealant for working joints, comprising the curable sealant composition according to claim 1.

11. A one-component curable sealant for curtain walls, comprising the curable sealant composition according to claim 1.

12. A one-component curable sealant for balcony window frames, comprising the curable sealant composition according to claim 1.

13. A one-component curable sealant for stone materials, comprising the curable sealant composition according to claim 1.

14. A one-component curable sealant for bridges, comprising
   the curable sealant composition according claim 1.

15. A cured product of the one-component curable sealant composition according to claim 1.

16. The one-component curable sealant composition according to claim 1, wherein the number of the triethoxysilyl groups in the organic polymer (A) per molecule of the polymer on average is 1.2 to 1.6.

17. The one-component curable sealant composition according to claim 1, which comprises 70 to 150 parts by weight of the plasticizer (C) for 100 parts by weight of the organic polymer (A).

* * * * *